US012089772B2

(12) United States Patent
Cai

(10) Patent No.: US 12,089,772 B2
(45) Date of Patent: Sep. 17, 2024

(54) COFFEE MACHINE

(71) Applicant: Jianming Cai, Guangdong (CN)

(72) Inventor: Jianming Cai, Guangdong (CN)

( * ) Notice: Subject to any disclaimer, the term of this patent is extended or adjusted under 35 U.S.C. 154(b) by 360 days.

(21) Appl. No.: 17/250,129

(22) PCT Filed: Dec. 3, 2019

(86) PCT No.: PCT/CN2019/122678
§ 371 (c)(1),
(2) Date: Dec. 2, 2020

(87) PCT Pub. No.: WO2020/228302
PCT Pub. Date: Nov. 19, 2020

(65) Prior Publication Data
US 2022/0053962 A1    Feb. 24, 2022

(30) Foreign Application Priority Data

May 10, 2019    (CN) .......................... 201910388504.8

(51) Int. Cl.
*A47J 31/00*    (2006.01)
*A47J 31/06*    (2006.01)
(Continued)

(52) U.S. Cl.
CPC ......... *A47J 31/005* (2013.01); *A47J 31/0668* (2013.01); *A47J 31/30* (2013.01);
(Continued)

(58) Field of Classification Search
None
See application file for complete search history.

(56) References Cited

U.S. PATENT DOCUMENTS 4,632,024 A * 12/1986 Cortese ................... A47J 31/30
99/293
2014/0322410 A1    10/2014 Khan et al.
(Continued)

FOREIGN PATENT DOCUMENTS

CN    105764390 A    7/2016
CN    106264143 A    1/2017
(Continued)

OTHER PUBLICATIONS

PCT Search Report and Written Opinion, PCT Appl. No. PCT/CN2019/122678, dated Feb. 4, 2020, 11 pages.
Extended European Search Report from European Patent Application No. 19929143.6 dated Apr. 4, 2022 (8 pages).
Communication Pursuant to Article 94(3) EPC from European Patent Application No. 19929143.6 dated Jan. 29, 2024 (4 pages).

*Primary Examiner* — Elizabeth M Kerr
(74) *Attorney, Agent, or Firm* — Perkins Coie, LLP

(57) ABSTRACT

Provided herein is a coffee machine, comprising a main body (1) that comprises a housing (101) of the main body, a pot liner (103) disposed within the housing (101), a heating mechanism for heating liquid in the pot liner (103), and a container (106) disposed above the pot liner (103) and being in communication with the inner space of the pot liner (103); a capsule base (2) detachably connected on the bottom of the main body (1); and a power-controller holder (3) detachably connected to the outside of the housing (101), for supporting, powering and controlling the main body (1). The coffee machine as described herein has a modularized structure for ease of using the coffee machine in various settings and ease of disassembly, maintenance and cleaning of the coffee machine.

19 Claims, 18 Drawing Sheets

(51) Int. Cl.
  *A47J 31/30* (2006.01)
  *A47J 31/44* (2006.01)
  *A47J 31/46* (2006.01)
(52) U.S. Cl.
  CPC ......... *A47J 31/4403* (2013.01); *A47J 31/461* (2018.08); *A47J 31/469* (2018.08)

(56) References Cited

U.S. PATENT DOCUMENTS

| | | | |
|---|---|---|---|
| 2015/0132458 A1* | 5/2015 | Lee | A47J 31/465 426/433 |
| 2017/0265676 A1* | 9/2017 | Cai | A47J 31/46 |
| 2017/0303734 A1* | 10/2017 | Balkau | A47J 31/4485 |

FOREIGN PATENT DOCUMENTS

| | | |
|---|---|---|
| CN | 207755080 U | 8/2018 |
| CN | 108968685 A | 12/2018 |
| CN | 208463693 U | 2/2019 |
| CN | 109419384 A | 3/2019 |
| CN | 109549489 A | 4/2019 |
| CN | 109567596 A | 4/2019 |
| CN | 110101306 A | 8/2019 |
| EP | 3181020 A1 | 6/2017 |
| WO | 2012022181 A1 | 2/2012 |
| WO | 2013037781 A1 | 3/2013 |

* cited by examiner

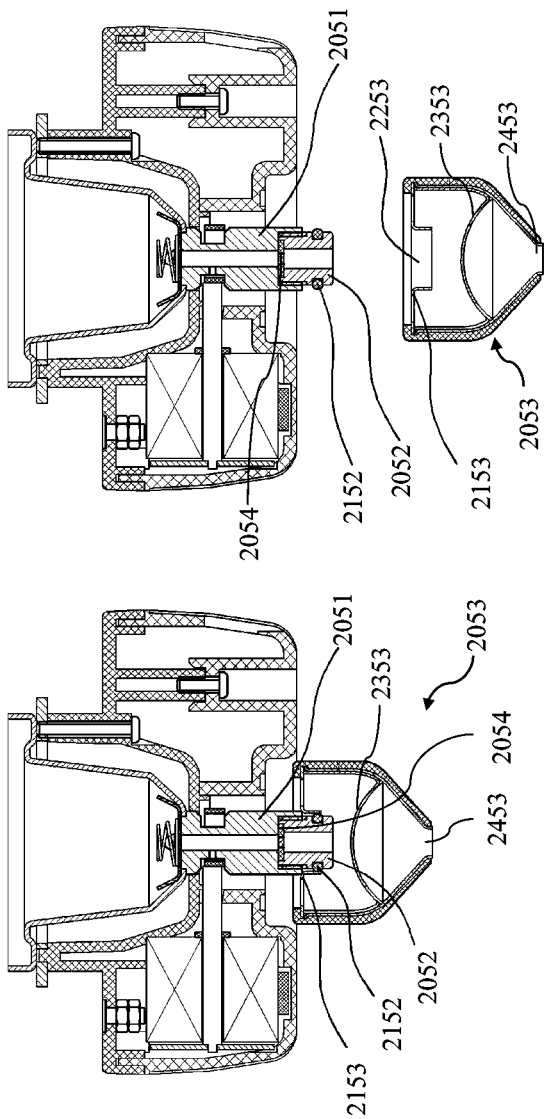

COFFEE MACHINE

CROSS REFERENCE TO RELATED APPLICATIONS

This application is a 371 National Phase Application of PCT Application No. PCT/CN2019/122678 entitled "COFFEE MACHINE", filed Dec. 3, 2019, which also claims priority to Chinese Patent Application Serial No. 201910388504.8, filed on May 10, 2019, entitled "COFFEE MACHINE", the entire disclosures of which are herein incorporated by reference.

FIELD OF THE INVENTION

The present invention relates to a coffee machine.

BACKGROUND OF THE INVENTION

Coffee is a very popular beverage in modern life. Coffee machines become common home appliances widely used in our daily work and life. Currently, large-scale coffee machines are not convenient for family and personal use, due to their huge volume and complex structure, while small-scale coffee machines still have no improvement on ease of use, although they have compact structures. This is because that the small-scale coffee machines typically have integrated structures which are not easy for disassembly, maintenance and cleaning.

SUMMARY OF THE INVENTION

Provided herein is a modularized coffee machine, which is set up by assembling modules. Each of modules can be disassembled for maintenance and cleaning and can be used in different settings.

According to the embodiments of the present invention, provided herein is a coffee machine, comprising a main body that comprises a housing, a pot liner disposed within the housing, a heating mechanism for heating liquid in the pot liner, and a container disposed above the pot liner and being in communication with the inner space of the pot liner; and a capsule base detachably connected on the bottom of the main body, which comprises a capsule holder for receiving a coffee capsule, a liquid outlet disposed below the capsule holder and being in communication with the capsule holder; a power-controller holder detachably connected to the outer side of the housing, for supporting, powering and controlling the main body. The capsule holder is suitable for being in communication with the inner space of the pot liner when the capsule base is connected to the main body.

According to the embodiments of the present invention, the coffee machine has three modules: the main body, the capsule base and the power-controller holder. They are detachably connected or assembled with each other for ease of manufacture, maintenance and cleaning and for improvement on production efficiency. Also, when one module malfunctions, it can be replaced or repaired, without maintenance or replacement of the whole machine, thereby reducing the maintenance cost.

In one embodiment of the present invention, the power-controller holder comprises a substrate with a mounting socket disposed on the top surface thereof, a supporting part detachably connected to the mounting socket. The supporting part is detachably connected to the housing of the main body.

According to the embodiments of the present invention, the substrate of the power-controller holder is detachably connected to the supporting part. In use, the substrate can be replaced as needed to satisfy various requirements in different settings. For example, when using in a car, the substrate can be replaced with the one for mounting in the car.

In one embodiment of the present invention, the supporting part can comprise a casing and a main rod disposed within the casing, for supporting the casing. The main rod has one end extending out from the casing, which is detachably mounted in the mounting socket of the substrate. The casing is detachably connected to the housing of the main body on one side thereof.

In one embodiment of the present invention, the inner wall of the casing is supported on the main rod by an elevating mechanism that is configured to allow the casing to move up and down along the main rod.

In one embodiment of the present invention, the main rod has a hollow structure. The elevating mechanism comprises, but not limited to, a motor fixed on the inner wall of the casing; a screw engaged with the output shaft of the motor and rotated with the rotation of the output shaft; a nut fixed within the hollow structure of the main rod. The threads of the nut are engaged with the threads of the screw, such that the casing is driven to move up and down when the screw is rotated with rotation of the output shaft.

According to the embodiments of the present invention, the elevating mechanism is disposed in the power-controller holder, such that the longitudinal dimension of the coffee machine can be adjusted according to the using settings. For example, when using coffee machine in a car, the longitudinal dimension of the coffee machine can be decreased by using the elevating mechanism to satisfy the small space in the car.

In one embodiment of the present invention, a cup holder is disposed on the top surface of the substrate of the power-controller holder, which is adjacent to the mounting socket and aligns with the bottom of the capsule base.

According to the embodiments of the present invention, the cup holder is configured to be disposed on the top surface of the substrate and to align with the bottom of the capsule base, such that the cup holder can be used to receive and hold a coffee cup that is used to receive coffee flowing from the bottom of the capsule base. Since the coffee flowing from the bottom of the capsule base is very hot, if no cup support is disposed, the users may get scald once the coffee cup is not placed firmly and coffee splits out. Therefore, the cup holder can avoid unsafety during making coffee.

In one embodiment of the present invention, the lower surface of the substrate of the power-controller holder is a flat surface for placing on a flat stage.

In another embodiment of the present invention, the power-controller holder has an engaging part on the lower surface of the substrate, for engaging with the hole on the stage. The engaging part is opposite to the cup holder and protrudes downward from the lower surface of the substrate.

According to the embodiments of the present invention, the power-controller holder can have various substrates, for example, the substrate with flat bottom or the substrate with the engaging part. The substrate with flat bottom is suitable for placing on the stage with flat surface (such as dining-table, and bar counter). The substrate with the engaging part is suitable for mounting on the stage with a hole (such as, a cup holder in the car). The coffee machine can be used in different settings by replacing the substrate, thereby eliminating the limitations to the using settings for the current coffee machines.

In one embodiment of the present invention, the stage can comprise a cup holder disposed in the vehicles (such as cars).

According to the embodiments of the present invention, the stage can be a platform for placing the coffee machine. According to different settings, the stages are not the same. For example, at home or in the café, the stage is a platform with a flat surface for ease of placement of the coffee machines with the flat substrate. In vehicles such as cars, or home vans and the like, since the vehicles may bump during movement, the stage needs to have a securing mechanism.

Accordingly, in one embodiment of the present invention, a snap-engaging part is disposed on the bottom of the coffee machine to engage with the cup holder in the vehicles, thereby mounting the coffee machine on the stage by using the securing mechanism.

In one embodiment of the present invention, the engaging part comprises, but not limited to, a snap-fitting disk disposed on the lower surface of the substrate, for adjusting the engaging dimension of the engaging part, and a fixing disk for connecting the snap-fitting disk and the substrate.

According to the embodiment of the present invention, the substrate with the engaging part can satisfies different settings by adjusting the dimension of the snap-fitting disk disposed on the lower surface of the substrate. For example, in a car, the diameter of the cup holder is small. The dimension of the snap-fitting disk can become small by adjustment so as to engage with the cup holder, such that the coffee machine can be firmly mounted in the car. Even if the car may bump during movement, the coffee machine will not fall down. In the case that the cup holders in certain cars are large, the dimension of the snap-fitting disk can become large by adjustment to engage with such cup holders. Therefore, the coffee machine with the engaging part can be used in various settings, thereby enhancing convenience of the coffee machine and broadening the use of the coffee machine.

In one embodiment of the present invention, the housing of the main body has a first connection feature disposed thereon, and the power-controller holder has a second connection feature disposed thereon. The first connection feature is detachably connected to the second connection feature.

In one embodiment of the present invention, the first connection feature comprises, but not limited to, a male tab disposed on a side surface of the housing facing the casing of the power-controller holder and having an extending part protruded from the said side surface; a buckle disposed on a side surface of the housing facing the casing of the power-controller holder and spaced from the male tab. The buckle has a bending part protruded from the said side surface.

In one embodiment of the present invention, the second connection feature comprises, but not limited to, an upper jack disposed on a side surface of the casing of the power-controller holder facing the main body and having an opening on this side surface to receive the male tab; a lower jack disposed on a side surface of the casing of the power-controller holder facing the main body, which is spaced from the upper jack and has an opening on this side surface to receive the buckle.

In one embodiment of the present invention, the extending part of the male tab has a through hole disposed thereon. The upper jack has a snap-fit mechanism disposed therein, which is engaged with the through hole to prevent the male tab from detaching from the upper jack.

In one embodiment of the present invention, the snap-fit mechanism comprises, but not limited to, a button comprising a pressing part passing through the inside of the casing and extending from the inside to the outside and a hook part extending from a side surface of the pressing part toward the opening of the upper jack; and a bottom plate located below the button and fixed on the casing, which elastically supports the button via a spring.

According to the embodiments of the present invention, a connection mechanism is disposed between the power-controller holder and the main body, for supporting and connecting the main body and the power-controller holder. The first connection feature is detachably connected to the second connection feature, thereby achieving ease of assembly of the main body and the power-controller holder. When a certain module malfunctions, it can be replaced and repaired timely, without disassembling and replacing the whole machine, thereby reducing the maintenance cost and time.

In one embodiment of the present invention, a first electrical connection feature is disposed on a side surface of the housing of the main body facing the casing of the power-controller holder, and a second electrical connection feature is disposed on a side surface of the casing of the power-controller holder facing the main body. The first electrical connection feature is engaged with and electrically connected with the second electrical connection feature to supply power to and be in communication with the main body.

In one embodiment of the present invention, the first electrical connection feature may comprise a plug and a power-taking nail disposed in a certinal interval on a side surface of the housing of the main body facing the casing of the power-controller holder. The second electrical connection feature may comprise a socket matching the plug and a power-supplying needle matching the power-taking nail disposed in a certinal interval on a side surface of the casing of the power-controller holder facing the main body.

In another embodiment of the present invention, the specific elements of the first and second electrical connection features are not limited to be mounted on the main body or the power-controller holder. For example, a part of elements of the first electrical connection feature are mounted on the main body, and another part of elements are mounted on the power-controller holder. The elements of the second electrical connection feature corresponding to the first electrical connection feature are mounted on the power-controller holder and the main body respectively, thereby achieving electrical connection of the main body and the power-controller holder, for ease of disconnection and assembly of the main body and the power-controller holder.

According to the embodiments of the present invention, the power-controller holder can control the main body by disposing the first and the second electrical connection features between the main body and the power-controller holder. The quality of coffee can be controlled by adjusting the heating mechanism or steam exhausting mechanism in the main body. Meanwhile, the first electrical connection feature is detachably connected to the second electrical connection feature, such that the main body can be easily disconnected with the power-controller holder. When a certain part malfunctions, it can be replaced, thereby reducing maintenance cost and shortening maintenance time.

In one embodiment of the present invention, the main body comprises a first steam exhausting mechanism disposed within the housing of the main body and located on the side wall of the pot liner, for adjusting the pressure in the pot liner.

In one embodiment of the present invention, the first steam exhausting mechanism comprises, but not limited to, a steam outlet disposed on the side wall of the pot liner and in communication with the inner space of the pot liner, a supporting feature fixed within the housing of the main body; an electromagnetic mechanism supported by the supporting feature, for producing magnetic force; and a steam exhausting valve sheet, disposed opposite to the steam outlet and supported on the supporting feature by a connection mechanism. The connection mechanism is suitable for interacting with the magnetic force produced by the electromagnetic mechanism to move the steam exhausting valve sheet, so as to allow the steam exhausting valve sheet to open or close the steam outlet.

According to the embodiments of the present invention, the steam exhausting mechanism disposed on the side wall of the pot liner can adjust the pressure of the pot liner according to the temperature of the pot liner or other parameters, such that high quality of coffee can be ensured. The first steam exhausting mechanism exhibits automatic adjustment function, which can perform automatic adjustment according to the preset parameters of the power-controller holder.

In one embodiment of the present invention, the capsule base further comprises a capsule base casing for receiving and supporting the capsule holder and the liquid outlet.

In one embodiment of the present invention, a third connection feature is disposed on the bottom of the housing of the main body, and a fourth connection feature is disposed on the top of the capsule base casing. The third connection feature is detachably connected to the fourth connection feature.

In one embodiment of the present invention, the third connection feature may comprise a snap-ring and the fourth connection feature may comprise a snap-tab matching the snap-ring. Alternatively, the third connection feature may comprise a snap-tab and the fourth connection feature may comprise a snap-ring matching the snap-tab.

According to the embodiments of the present invention, the third and fourth connection features disposed between the main body and the capsule base can be used to achieve ease of disconnection and assembly of the main body and the capsule base, and ease of cleaning and detachment of the capsule base.

In one embodiment of the present invention, a third electrical connection feature is disposed on the bottom of the housing of the main body. A fourth electrical connection feature is disposed on a position on the top of the capsule base casing, corresponding to the third electrical connection feature. The third electrical connection feature is detachably connected to the fourth electrical connection feature.

According to the embodiments of the present invention, the third and fourth electrical connection features are disposed between the main body and the capsule base so as to control the elements within the capsule base, thereby controlling the pressure in the capsule base. As such, the brewing state in the capsule base can be controlled in time, thereby enhancing the quality of coffee.

In one embodiment of the present invention, the liquid outlet comprises, but not limited to, a nozzle socket connected to the bottom of the capsule holder and having a channel in communication with the capsule holder, a nozzle removably mounted in the nozzle socket and in communication with the channel, and a steam-liquid separator detachably connected to the nozzle, for separating the water vapor from the liquid and discharging the liquid.

According to the embodiment of the present invention, the steam and the liquid can be separated by using the liquid outlet having the steam-liquid separator, so as to ensure the high quality of coffee.

In one embodiment of the present invention, a channel valve for opening or closing the channel is disposed at the connection part between the nozzle socket and the nozzle.

In one embodiment of the present invention, the capsule base may further comprise a second steam exhausting mechanism disposed on the side wall of the nozzle socket, for adjusting the pressure in the nozzle socket.

In one embodiment of the present invention, the second steam exhausting mechanism comprises, but not limited to, a steam outlet disposed on the side wall of the nozzle socket and in communication with the channel within the nozzle socket, a supporting feature fixed in the capsule base casing, an electromagnetic mechanism supported by the supporting feature, for producing magnetic force, and a steam exhausting valve sheet opposite to the steam outlet and supported on the supporting feature by a connection mechanism. The connection mechanism is suitable for interacting with the magnetic force produced by the electromagnetic mechanism to move the steam exhausting valve sheet to open or close the steam outlet.

According to the embodiments of the present invention, the second steam exhausting mechanism disposed in the capsule base can adjust the pressure in the capsule holder and the liquid outlet according to the brewing time or state of coffee in the capsule base, to ensure the quality of coffee.

In one embodiment of the present invention, the container of the main body comprises but not limited to, a cup disposed on the top of the housing of the main body and having a through hole on the bottom thereof for being in communication with the inner space of the pot liner, a flow-limiting valve disposed on the bottom of the cup, for opening or closing the through hole, and a valve rod disposed in the cup and connected to the flow-limiting valve, which is configured to be manipulated to control the flow-limiting valve to open and close.

In one embodiment of the present invention, the container may further comprise a cup ring disposed on the top of the cup, with an inner diameter smaller than that of the cup, a floating lid with a hole around the valve rod and configured to be disposed within the cup and move along the cup up and down. When the floating lid moves to the top of the cup, it abuts against the cup ring to close the opening of the cup.

According to the embodiments of the present invention, the container disposed on the top of the main body can control the volume of the liquid in the container, such that the user can control the volume of water to be flowing into the pot liner as needed. Therefore, the quality of coffee can be controlled by controlling the volume of water used for brewing coffee.

The coffee machine as described herein has following advantages.

The main body, the capsule base and the power-controller holder are configured to be modularized structure and detachably connected with each other, such that it is easy to disassemble the coffee machine for maintenance when fault occurs and it is easy to clean the coffee machine. The detachable substrate is disposed on the bottom of the power-controller holder, which has an engaging part to engage with the cup holder in cars, for ease of using the coffee machine in cars. Meanwhile, the substrate can be replaced with a flat substrate to use at home, in the restaurant or café. The power-controller holder is electrically connected to the capsule base and the main body, which not only supports the main body and the capsule base but also achieves electrically controlling of the main body and the capsule base, thereby ensuring the quality of coffee. In addition, the elevating mechanism is mounted in the power-controller holder to ensure that the longitudinal dimension of the coffee machine can be adjusted according to the using settings for ease of taking out of the coffee cup.

In sum, the coffee machine as described herein has a modularized structure and the modules are detachably connected to each other, for ease of disassembly and assembly during maintenance. Meanwhile, the coffee machine as described herein can be used in different settings such as at home or in cars, which has excellent design, high safety and can be used to make coffee with high quality.

BRIEF DESCRIPTION OF THE DRAWINGS

FIG. 16(a) illustrates that the capsule base of the coffee machine is engaged with the steam-liquid separator according to one embodiment as described herein.

FIG. 16(b) illustrates that the capsule base of the coffee machine is disconnected with the steam-liquid separator according to one embodiment as described herein.

DETAILED DESCRIPTION OF THE INVENTION

Unless otherwise defined, all technical and scientific terms used herein have the same meaning as commonly understood by one of ordinary skill in the art to which this invention belongs.

The terminology used herein is for the purpose of describing particular embodiments only and is not intended to be limiting of the invention. As used herein, the singular forms "a", "an" and "the" are intended to include the plural forms as well, unless the context clearly indicates otherwise.

The coffee machine as described herein utilizes modularized structure design, which comprises, but not limited to, the following three modules: a main body, a capsule base and a power-controller holder. The modules are detachably connected with each other to assemble a whole coffee machine. When one module malfunctions, it can be disconnected to perform maintenance and can be replaced by a new module to ensure the normal operation of the coffee machine, thereby enhancing efficiency and saving time.

FIGS. 1 to 16(b) show one embodiment of the coffee machine as described herein. The substrate thereof has a flat structure for placing on flat supporting surfaces such as tables, bar-counters and the like. The coffee machine of this embodiment will be described in greater detail as below.

Figure 1:
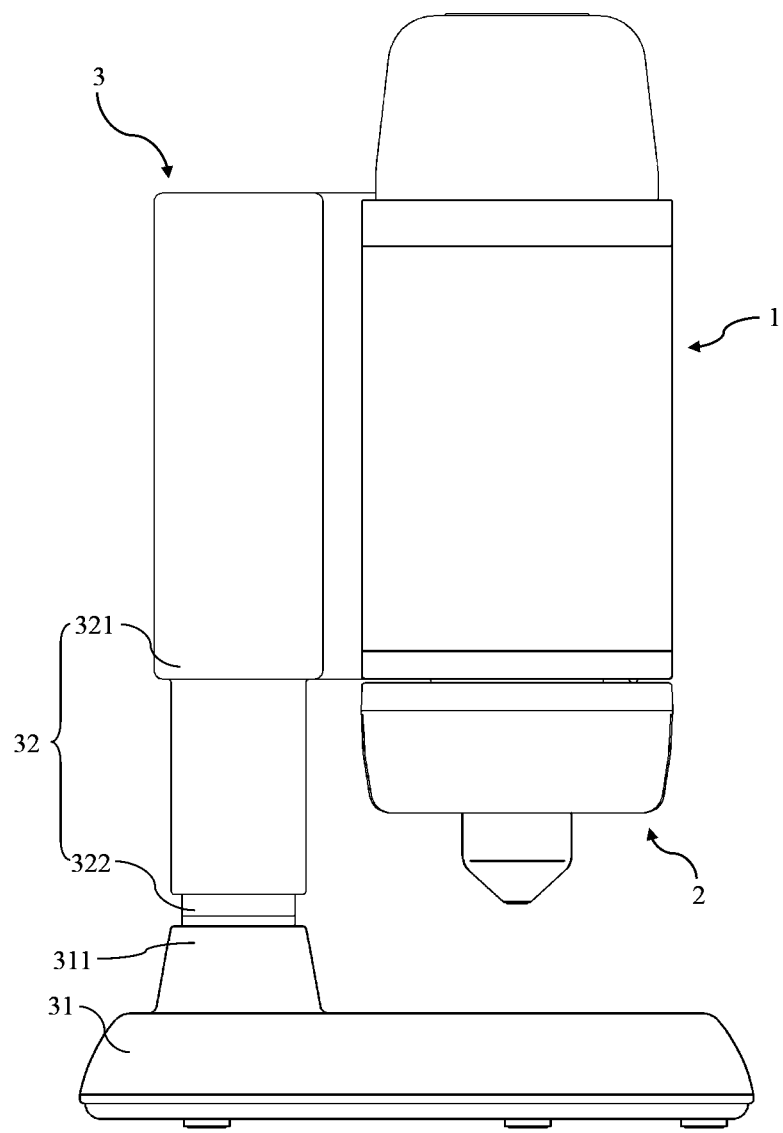
FIG. 1 is a schematic diagram of the whole coffee machine according to one embodiment as described herein.

FIG. 1 is a schematic diagram of the whole coffee machine according to one embodiment as described herein. It should be noticed that, this structure of the coffee machine is merely illustrative, which should not be construed as any limitations on features of the coffee machine such as shapes or structures. That is to say, the skilled in the art is able to apply the innovative features of the present invention to other coffee machines, not limited to the coffee machine with the shape as shown in FIG. 1. And such application comes within the protection scope of the present invention.

As shown in FIG. 1, the coffee machine can comprise three modules which are a main body 1, a capsule base 2 and a power-controller holder 3. The main body 1 can be detachably mounted on the power-controller holder 3 and the capsule base 2 can be detachably mounted below the main body 1. The power-controller holder 3 can supply power to and provide instructions with the main body 1 and the capsule base 2.

Figure 2:
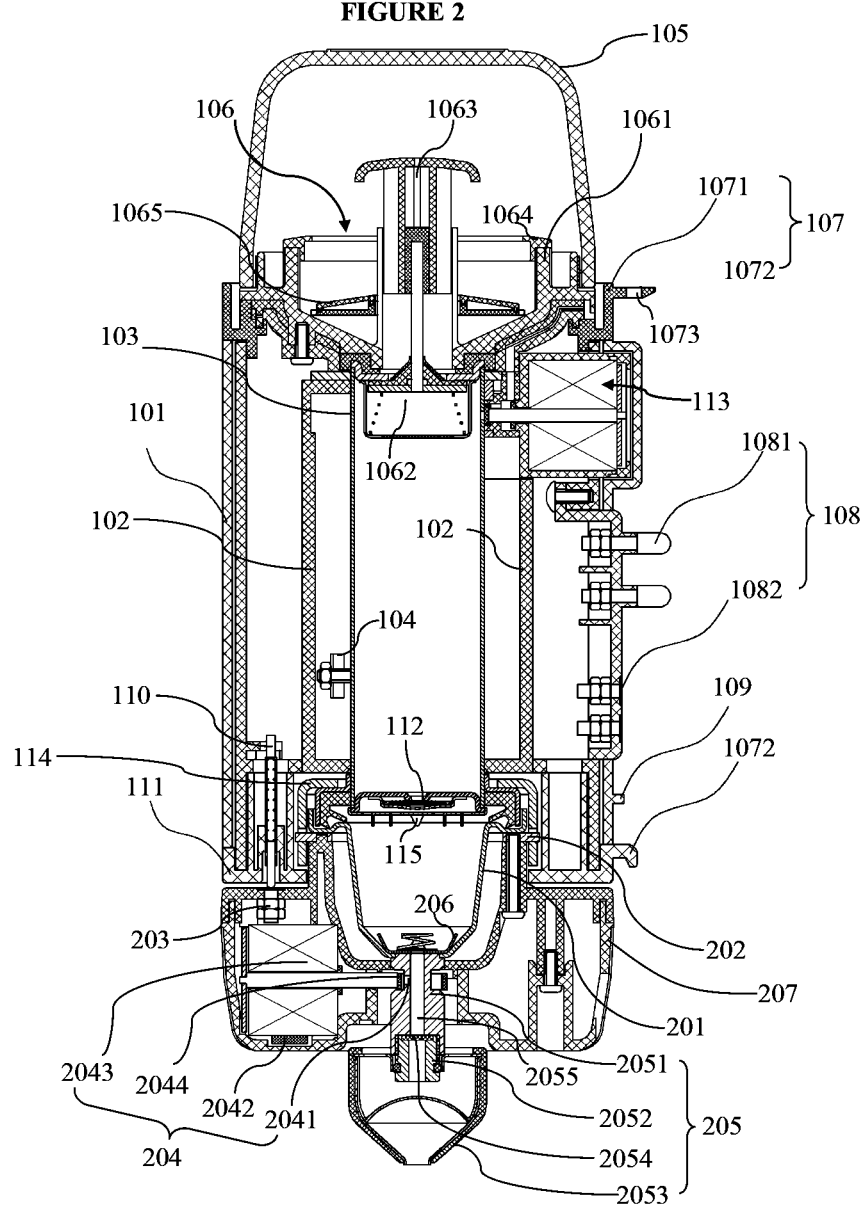
FIG. 2 is a schematic diagram of the main body and the capsule base of the coffee machine according to one embodiment as described herein.

Referring to FIGS. 1 and 2, the main body 1 can comprise, but not limited to: a housing comprising a body housing 101 that is detachably connected to the power-controller holder 3, a top lid 105 disposed on the top of the body housing 101, a bottom lid 111 disposed on the bottom of the body housing 101 and detachably connected to the capsule base 2; a pot liner 103 mounted within the body housing 101; a cup 106 as a container connected to the top of the pot liner 103 and in communication with the inner space of the pot liner 103; a steam exhausting mechanism 113 (i.e., the first steam exhausting mechanism) disposed on the side wall of the pot liner 103, for automatically or manually adjusting the pressure in the pot liner 103; a heating mechanism disposed around the pot liner 103 for heating the liquid in the pot liner 103; a temperature controller 104 disposed on the lower side wall of the pot liner 103 for adjusting and controlling the temperature of the liquid in the pot liner 103; an automatic draining mechanism 112 disposed on the bottom of the pot liner 103 and configured to be automatically opened or closed according to the temperature of the water in the pot liner 103; a puncture part 115 disposed below the automatic draining mechanism 112; and a plurality of layers of insulation sleeves disposed around the pot liner 103 for thermal insulation of the pot liner 103, on the outer wall of which is the body housing 101 of the main body power-controller holder. The pot liner 103 can be in a cylinder shape. In an alternative embodiment, the pot liner 103 can be in various shapes such as elliptic cylinder, cuboid and the like. The cup 106 can be used to quantitatively add water into the pot liner 103 and the top lid 105 for the main body is covered on the top of the cup to prevent dust from falling into the cup 106 and prevent liquid from spilling out from the cup 106. The puncture part 115 is abutted against and pierces the coffee capsule received in the capsule base 2 during brewing coffee such that the liquid flows into the coffee capsule to complete brewing action.

Figure 3:
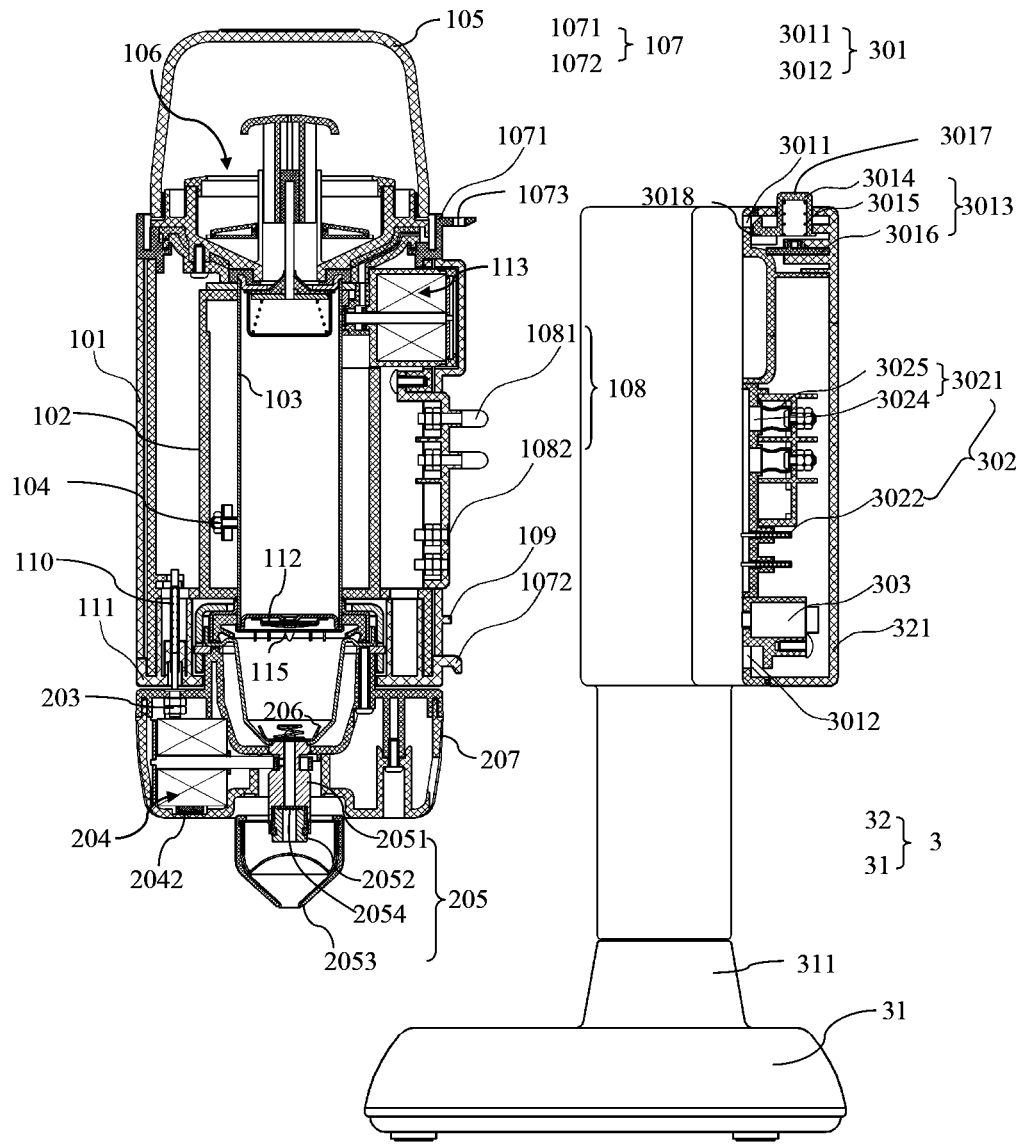
FIG. 3 illustrates that the main body is disconnected with the power-controller holder according to one embodiment as described herein.
Figure 4:
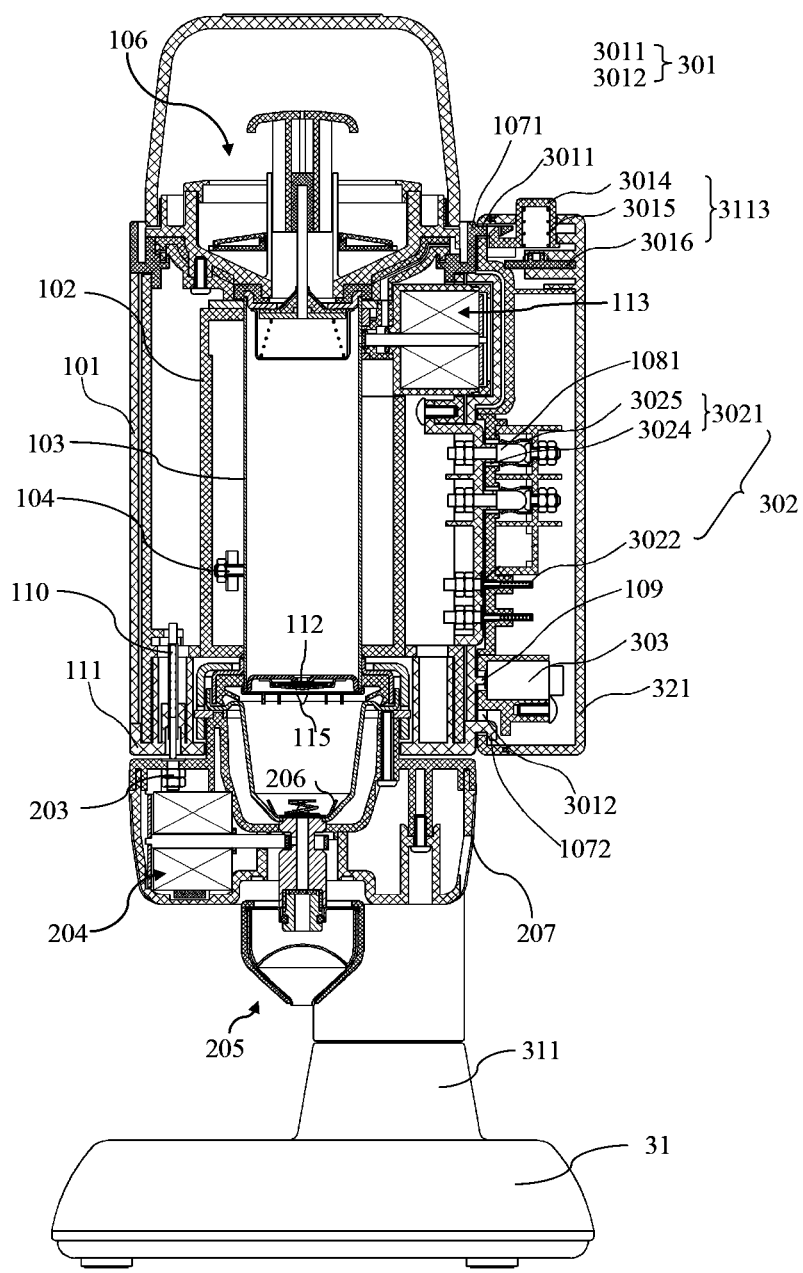
FIG. 4 illustrates that the main body is engaged with the power-controller holder according to one embodiment as described herein.

Referring to FIG. 2, the capsule base 2 is detachably mounted on the bottom of the main body 1 of the coffee machine. The capsule base 2 comprises but not limited to: a capsule holder 201 disposed within the capsule base casing 207 for receiving the coffee capsule; a liquid outlet 205 connected to the bottom of the capsule holder 201 and in communication with the capsule holder 201; a steam exhausting mechanism 204 (i.e., the second steam exhausting mechanism) disposed on the side wall of the liquid outlet for adjusting the pressure in the liquid outlet 205 so as to control the quality of coffee brewing in the capsule base. Referring to FIGS. 2, 3 and 4, a puncture part 206 is disposed on the bottom of the capsule holder 201 for piercing the coffee capsule. When the main body 1 and the capsule base 2 are assembled together, the puncture part 206 is abutted against and pierces the bottom of the coffee capsule, so as to ensure that the coffee brewed from the coffee capsule can flow into the liquid outlet 205. The liquid outlet 205 comprises a nozzle socket 2051 directly connected to the capsule base 201, a nozzle 2052 that is removably mounted below the nozzle socket 2051, a steam-liquid separator 2053 detachably connected to the nozzle 2052 and a constant pressure rubber sheet 2054 (as an example of a channel valve) disposed on the connection position of the nozzle socket 2051 and the nozzle 2052. The nozzle socket 2051 has a channel 2055 disposed therein and being in direct communication with the capsule holder 201, such that the liquid can be ensured to flow from the capsule holder 201 into the steam-liquid separator 2053. The nozzle socket 2051 is in threaded connection with the nozzle 2052 for ease of disassembly and cleaning. The channel 2055 can be opened by the constant pressure rubber sheet 2054 when internal pressure of the channel 2055 of the liquid outlet 205 arrives at a preset value, and the channel 2055 can be closed when internal pressure of the channel 2055 is smaller than a preset value, such that the internal pressure in the nozzle socket 2051 keeps constant during brewing coffee, thereby enhancing the quality of the brewed coffee. In other embodiments of the present invention, other valves can be used to open or close the channel 2055 when the internal pressure in the channel 2055 arrives at the preset value.

Figure 5:
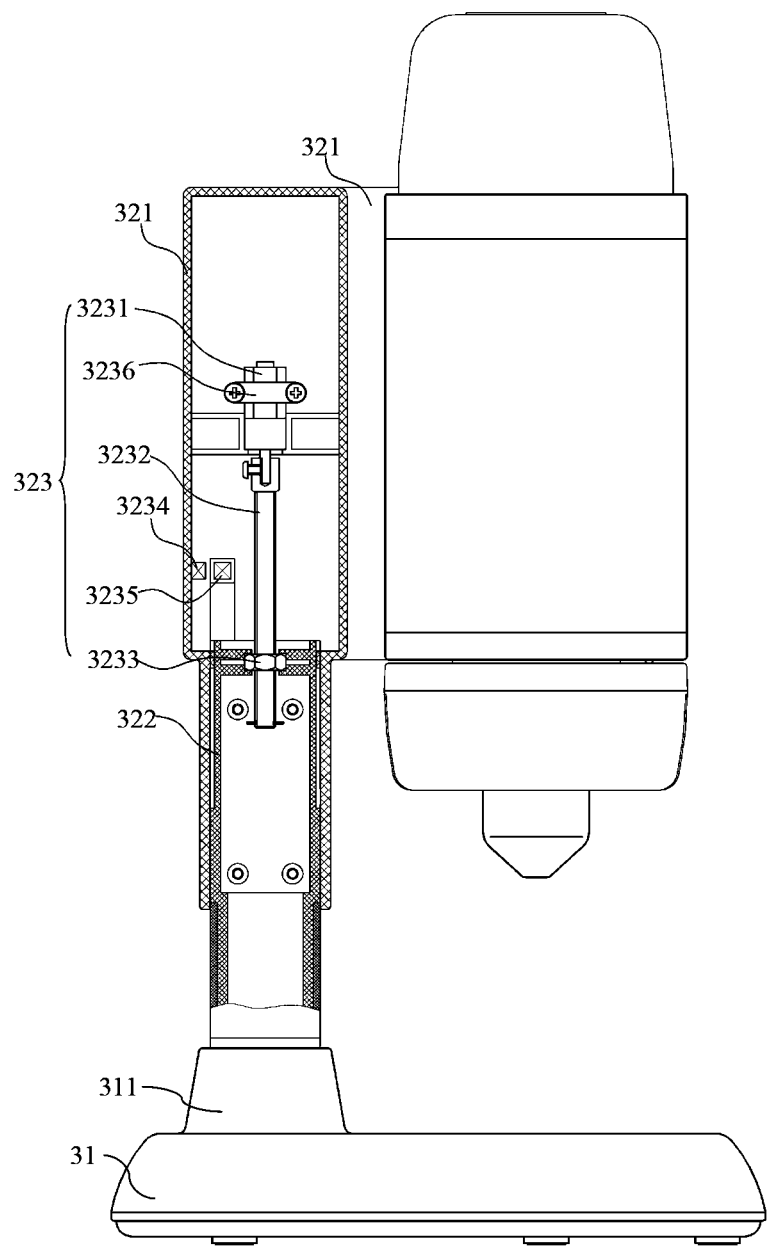
FIG. 5 illustrates that the power-controller holder is elevated according to one embodiment as described herein.

Referring to FIGS. 1, 3 and 5, the power-controller holder 3 can comprise a substrate 31 and a supporting part 32. The substrate 31 can be detachably mounted on the lower sider of the supporting part 32. The supporting part 32 can comprise a housing 321, a main rod 322 and an elevating mechanism 323 mounted in the housing 321 for connecting the housing 321 and the main rod 322. A mounting socket 311 is disposed on the top surface of the substrate 31. The main rod 322 is detachably connected to the mounting socket 311. The body housing 101 of the main body is detachably connected to the housing 321, such that the main body 1 and the capsule base 2 as a whole are supported by the power-controller holder 3, and the elevating mechanism 323 can drive the housing 321 to move up and down relative to the main rod 322, thereby adjusting the longitudinal dimension of the main body 1, which will be described in greater detail by referring to FIGS. 5 and 6. In this embodiment, the main body 1 and capsule base 2 are supplied with power and controlled by the power-controller holder 3. For example, a switch (not shown) and a controlling button (not shown) can be disposed on the housing 321 of the power-controller holder 3. The user can operate the switch to turn on or turn off the coffee machine and can operate the controlling button to adjust and control the internal temperature and pressure in the main body 1 and the capsule base 2. Furthermore, in this embodiment, the bottom of the substrate 31 can be configured to be a flat plane so as to place the coffee machine on a flat stage such as dining-table or bar counter and the like.

Referring to FIGS. 1, 3 and 4, a first connection feature 107 and a second connection feature 301, both of which match each other, can be used to detachably connect the main body 1 and the power-controller holder 3. A first electronic connection feature 108 and a second electronic connection feature 302 are used to electronically connect and control the main body 1 and the power-controller holder 3. A third connection feature and a fourth connection feature are used to detachably connect the hose machine 1 and the capsule base 2. A third electronic connection feature 110 and a fourth electronic connection feature 203 are used to electronically connect and control the main body 1 and the capsule base 2.

The first connection feature 107 and the first electric connection feature 108 are disposed on a side of the body housing 101 of the main body facing the power-controller holder 3. The first connection feature 107 comprises a male tab 1071 disposed on the upper side wall of the body housing 101 and facing the casing 321 of the power-controller holder 3 and a buckle 1072 disposed on the bottom lid 111 of the main body and facing the casing 321 of the power-controller holder 3. The male tab 1071 and the buckle 1072 are disposed in an interval. The male tab 1071 has an extending part protruded from the side wall of the body housing 101 of the main body. The extending part has a through hole 1073 which preferably has a rectangle shape. The through hole 1073 may have other shapes. The buckle 1072 has a bending part curved downward. The first electric connection feature 108 is disposed on a side surface of the body housing 101 facing the casing 321 of the power-controller holder 3, and located between the male tab 1071 and the buckle 1072, which supply power to and provide controlling signals with the main body 1. The first electric connection feature 108 comprises a plug 1081 protruded from the body housing 101 and a power-taking nail 1082 embedded into the body housing 101 and aligning with the surface of the body housing 101. In addition, a protrusion leg 109 of the main body is disposed between the male tab 1071 and the buckle 1072.

The second connection feature 301 and the second electric connection feature 302 are disposed on a side of the casing 321 of the power-controller holder 3 facing the main body 1. The second connection feature 301 comprises an upper jack 3011 matching the male tab 1071 on the main body 1 and a lower jack 3012 matching the buckle 1072 on the main body 1. A snap-fitting mechanism 3013 for snap-fitting with the male tab 1071 is disposed within the upper jack 3011. The snap-fitting mechanism 3013 comprises a snap button 3014, a snap button spring 3015 and a baseboard 3016. The snap button 3014 comprises a pressing part 3017 passing through the casing 321 and extending to the outer space and a hook part 3018 extending from the side surface of the pressing part 3017 toward the opening of the upper jack 3011. The snap button 3014 is supported by both the snap button spring 3015 and the baseboard 3016 that are disposed below the snap button 3014. The baseboard 3016 is fixed within the casing 321. The second electric connection feature 302 comprises a socket 3021 matching the plug 1081 of the main body 1 and an extendable power-supplying needle 3022 matching the power-taking nail 1082. The socket 3021 comprises a jack 3024 and socket clamping sheets 3025 distributed on the side wall of the jack. A spring is disposed on one end of the power-supplying needle 3022. When the main body 1 is mounted on the casing 321 of the power-controller holder 3, the power-taking nail 1082 presses the spring on one end of the power-supplying needle to ensure that the power-taking nail 1082 well contacts the power-supplying needle 3022. Even if the main body 1 slightly moves relative to the power-controller holder 3, the circuit will not be cut off. In addition, a limiting switch 303 is also disposed on a side of the casing 321 of the power-controller holder 3 facing the main body 1, which is mounted between the upper jack 3011 and the lower jack 3012 and located on a position matching the protrusion leg 109 of the main body. In an alternative embodiment, the power-supplying needle 3022 may have a hollow structure and a part of spring is received in the hollow structure to elastically support the power-supplying needle 3022.

When the main body 1 is mounted on the power-controller holder 3, as shown in FIG. 4, the first connection feature 107 fits with the second connection feature 301, and the first electric connection feature 108 fits with the second electric connection feature 302. In particular, the male tab 1071 of the first connection feature 107 is inserted into the upper jack 3011 of the second connection feature 301. The hook part 3018 of the snap-fitting mechanism 3013 in the upper jack 3011 goes through the through hole 1073 on the male tab 1071, such that the male tab 1071 is fixed in the upper jack 3011. The buckle 1072 of the first connection feature 107 is inserted into the lower jack 3012 of the second connection feature 301, such that the bending part of the buckle 1072 is snap-fitted with the lower jack 3012 to fix the buckle 1072 into the lower jack 3012. The plug 1081 of the first electric connection feature 108 is inserted into the socket 3021 of the second electric connection feature 302, such that the plug 1081 is clamped by the socket clamping sheets 3025 of the socket 3021 to keep good electric contact. The power-taking nail 1082 of the first electric connection feature 108 contacts the power-supplying needle 3022 of the second electric connection feature 302. The power-supplying needle 3022 has an extendable structure with a spring on the bottom thereof. When the main body is mounted on the casing 321 of the power-controller holder 3, the power-taking nail 1082 presses the spring on the bottom of the power-supplying needle 3022. Even if the main body 1 slightly moves relative to the power-controller holder 3, the circuit will not be cut off. Therefore, the power-supplying needle 3022 keeps in pressed state to ensure that the power-taking nail 1082 well contacts the power-supplying needle 3022, during mounting.

In addition, when the main body 1 is mounted on the power-controller holder 3, the protrusion leg 109 disposed between the male tab 1071 and the buckle 1072 is abutted against the limiting switch 303 disposed on a side of the casing 321 of the power-controller holder facing the main body 1. The protrusion leg 109 presses the limiting switch 303 to allow the contacting point of the limiting switch 303 to be in turn-on state. At this time, the power and the controlling signals are supplied to the main body 1 from the power-controller holder 3 through the second electric connection feature 302, such that the power-controller holder 3 supplies power to and controls the main body 1.

When disconnecting the main body 1 and the power-controller holder 3, as shown in FIG. 3, the first connection feature 107 is disconnected with the second connection feature 301, and the first electric connection feature 108 is disconnected with the second electric connection feature 302. In particular, the user presses the snap-fitting mechanism 3013 in the upper jack 3011 disposed on the upper side of the power-controller holder 3, such that the hook part 3018 exits from the through hole 1073 of the male tab 1071 by pressing the pressing part 3017 on the pressing button 3014 of the snap-fitting mechanism 3013, thereby disconnecting the male tab 1071 from the upper jack 3011. After the male tab 1071 is disconnected with the upper jack 3011, the buckle 1072 can be easily took out from the lower jack 3012, thereby disconnecting the first connection feature 107 with the second connection feature 301.

When the first electric connection feature 108 is disconnected with the second electric connection feature 302, it merely needs to disconnect the main body 1 with the power-controller holder 3. At this time, the plug 1081 disposed on the side wall of the main body 1 is withdrawn from the socket 3021 of the power-controller holder 3. Contact between the power-taking nail 1082 and the power-supplying needle 3022 is cut off, thereby cutting off the electric connection between the main body 1 and the power-controller holder 3.

In addition, when the main body 1 is disconnected with the power-controller holder 3, the protrusion leg 109 disposed on the side wall of the main body 1 facing the side wall of the power-controller holder 3 is disconnected with the limiting switch 303 disposed on the power-controller holder 3. The protrusion leg 109 is not abutted against the limiting switch 303. After the main body 1 is disconnected with the power-controller holder 3, the contacting point of the limiting switch 303 is in cut-off state. At this time, the second electric connection feature 302 for supplying power and controlling signals from the power-controller holder 3 to the main body 1 has no power, so as to protect the user from getting an electric shock since the user contacts the second electric connection feature 302.

In an alternative embodiment of the present invention, the first connection feature 107 and the second connection feature 301 can be partly disposed on the main body 1 or the power-controller holder 3 corresponding to the main body 1. For example, the male tab 1071 can be disposed on the power-controller holder 3 and the buckle 1072 can be disposed on the main body 1, such that the upper jack 3011 and the snap-fitting mechanism 3013 on the second connection feature 301 are disposed on the main body 1, and the lower jack 3012 is mounted on the power-controller holder 3. As such, the main body 1 is detachably mounted on the power-controller holder 3. Meanwhile, the first electric connection feature 108 and the second electric connection feature 302 can be partly mounted on the main body 1 and the power-controller holder 3 respectively by the similar way. For example, the plug 1081 is mounted on the power-controller holder 3 and the socket 3021 corresponding to the plug 1081 is mounted on the main body, such that the power-controller holder 3 is electronically connected to the main body 1, and the power-controller holder 3 supplies power to the main body 1.

Although in this embodiment the first connection feature 107 and the first electric connection feature 108 are mounted on the main body 1 and the second connection feature 301 and the second electric connection feature 302 are mounted on the power-controller holder 3, the first connection feature 107 and the first electric connection feature 108, and the second connection feature 301 and the second electric connection feature 302 can be mounted in any combination so as to detachably connect the power-controller holder 3 and the main body 1, which pertains to the scope of the present invention.

In another embodiment of the present invention, the first connection feature 107 is connected with the second connection feature 301 by fitting a bolt with a nut, such that the first connection feature 107 can be detachably connected to the second connection feature 301 for ease of maintenance and cleaning of the coffee machine.

In other alternative embodiments, on the body housing 101 of the main body, the plug 1081 can be located above the male tab 1071 and the power-taking nail 1082 can be located below the buckle 1072. Alternatively, both the plug 1081 and the power-taking nail 1082 can be located above the male tab 1071. Alternatively, both the plug 1081 and the power-taking nail 1082 can be located below the buckle 1072. Correspondingly, on the casing of the power-controller holder, the socket 3021 and the power-supplying needle 3022 are disposed on the positions corresponding to the plug 1081 and the power-taking nail 1082 respectively.

Figure 6:
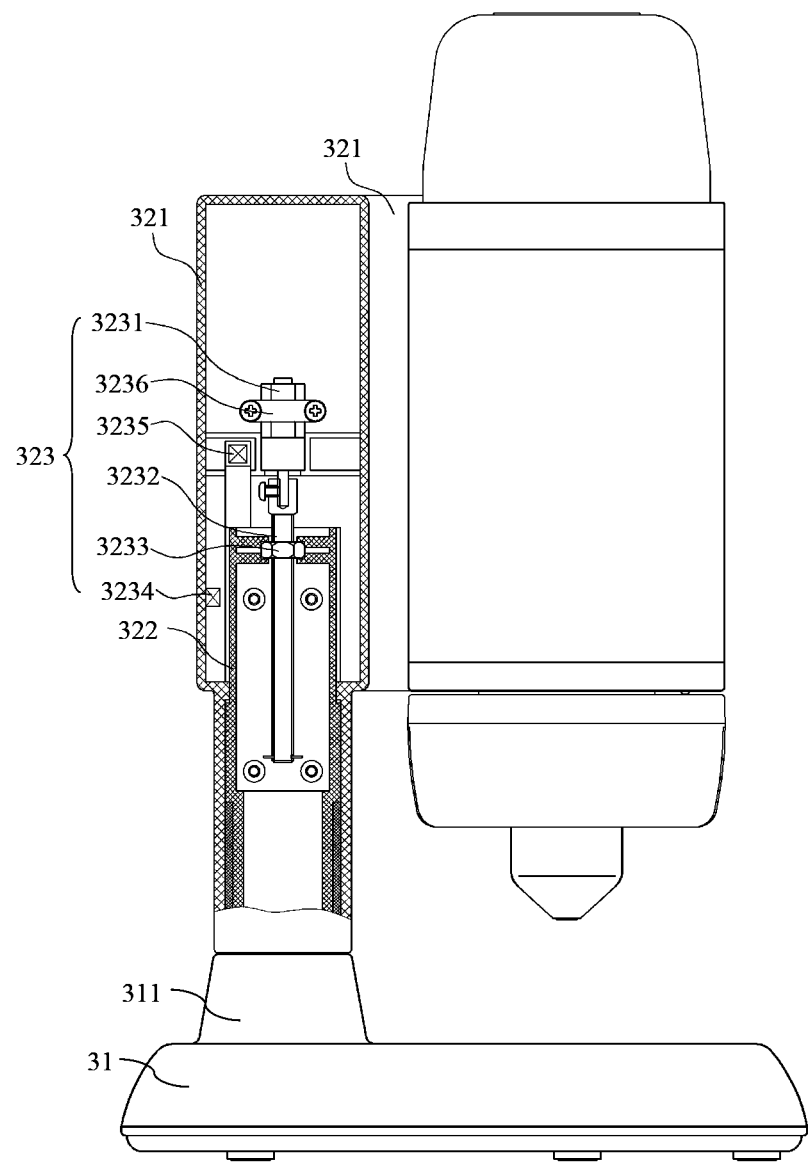
FIG. 6 illustrates that the power-controller holder is declined according to one embodiment as described herein.

FIGS. 5 and 6 respectively illustrate elevation and decline of the power-controller holder of the coffee machine according to one embodiment as described herein. As shown in FIGS. 5 and 6, an elevating mechanism 323 for adjusting the longitudinal dimension of the power-controller holder 3 is disposed on the inner wall of the casing 321 of the power-controller holder 3, which comprises a motor 3231 mounted on the inner wall of the casing 321, a screw 3232 connected to the output shaft of the motor 3231, and a nut 3233 fixed within the hollow structure of the main rod 322. The motor 3231 is fixed on the inner wall of the casing 321 by using a motor pressing block 3236. The screw 3232 is connected to the output shaft of the motor 3231 by using a bolt. The screw 3232 is engaged with the nut 3233. When the screw 3232 is driven to rotate by the output shaft of the motor 3231, the screw 3232 moves relative to the nut 3233, such that the main rod 322 moves relative to the casing 321 so as to adjust the longitudinal dimension of the power-controller holder 3. A magnetic controller 3234 is disposed on a lower position of the side wall of the casing 321. A magnet is protruded from the top of the main rod 322. As shown in FIG. 6, when the power-controller holder 3 has the smallest longitudinal dimension, the magnet 3235 is in a position higher than the magnetic controller 3234. The longitudinal dimension of the power-controller holder 3 can be adjusted by controlling rotation of the motor 3231. When the longitudinal dimension of the power-controller holder 3 is increased, the distance between the magnet 3235 and the magnetic controller 3234 is decreased. As shown in FIG. 5, when the magnet 3235 gets close to the magnetic controller 3234, the magnetic controller 3234 sends a stopping signal to the motor 3231, such that rotation of the motor 3231 is stopped and the power-controller holder 3 has the largest longitudinal dimension.

In this embodiment, the motor 3231 is disposed within the casing 321 and the nut 331 is fixed on the main rod 322. Alternatively, the motor 3231 can be disposed on the main rod 322 and the nut 331 can be fixed within the casing 321, so as to achieve adjustment of the longitudinal dimension of the power-controller holder 3, which pertains to the scope of the present invention.

In another embodiment of the present invention, the elevating mechanism 323 can utilize worm-gear feature. In particular, a knob is disposed on the casing 321, and a worm gear is fixed within the hollow structure of the main rod 322 for limiting a worm shaft. The worm shaft is disposed on the inner wall of the casing 321, which can be rotated relative to the casing 321 and the main rod 322. The knob is fixed on the top of the shaft and the shaft is engaged with the gear. When the knob is rotated, the shaft is driven to rotate, such that the casing 321 moves relative to the main rod 322 to achieve adjustment of the longitudinal dimension of the power-controller holder 3.

In another alternative embodiment of the present invention, the elevating mechanism 323 can be configured as a hydraulic-driven mechanism, which can drive the casing 321 to move relative to the main rod 322 so as to adjust the longitudinal dimension of the coffee machine. In another alternative embodiment of the present invention, the magnetic controller 3234 is disposed on the top of the main rod 322, and the magnet 3235 is disposed on the inner wall of the casing 321 of the power-controller holder 3. As such, the motor 3231 can be controlled to stop rotating when the power-controller holder 3 is elevated to the highest position, which pertains to the scope of the present invention.

In another alternative embodiment of the present invention, the casing 321 of the power-controller holder can be configured to be integrated with the main rod 322 as a whole, such that the integrated casing 321 and main rod 322 can be used to replace the elevating mechanism 323. The casing 321 of the power-controller holder and the main body can be detachably mounted and a substrate 31 can be detachably mounted on the bottom of the power-controller holder 3. Such configuration also achieves modularized and detachable structure design.

Figure 7:
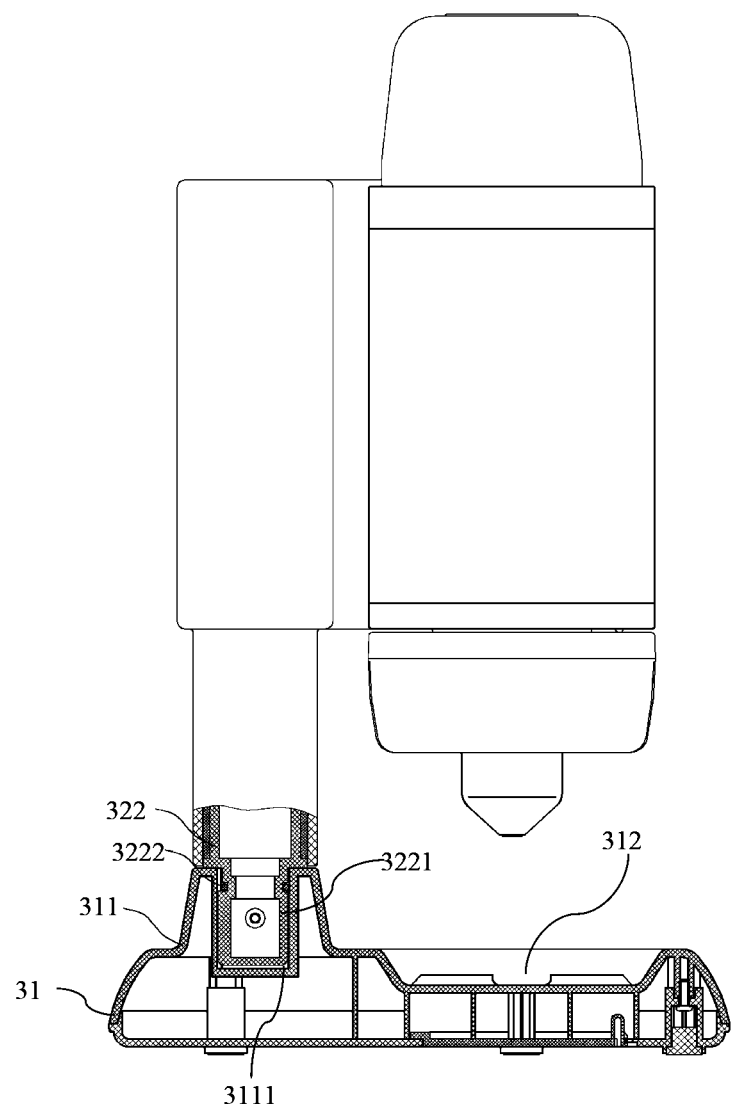
FIG. 7 illustrates that the substrate of the coffee machine is engaged with the power-controller holder according to one embodiment as described herein.
Figure 8:
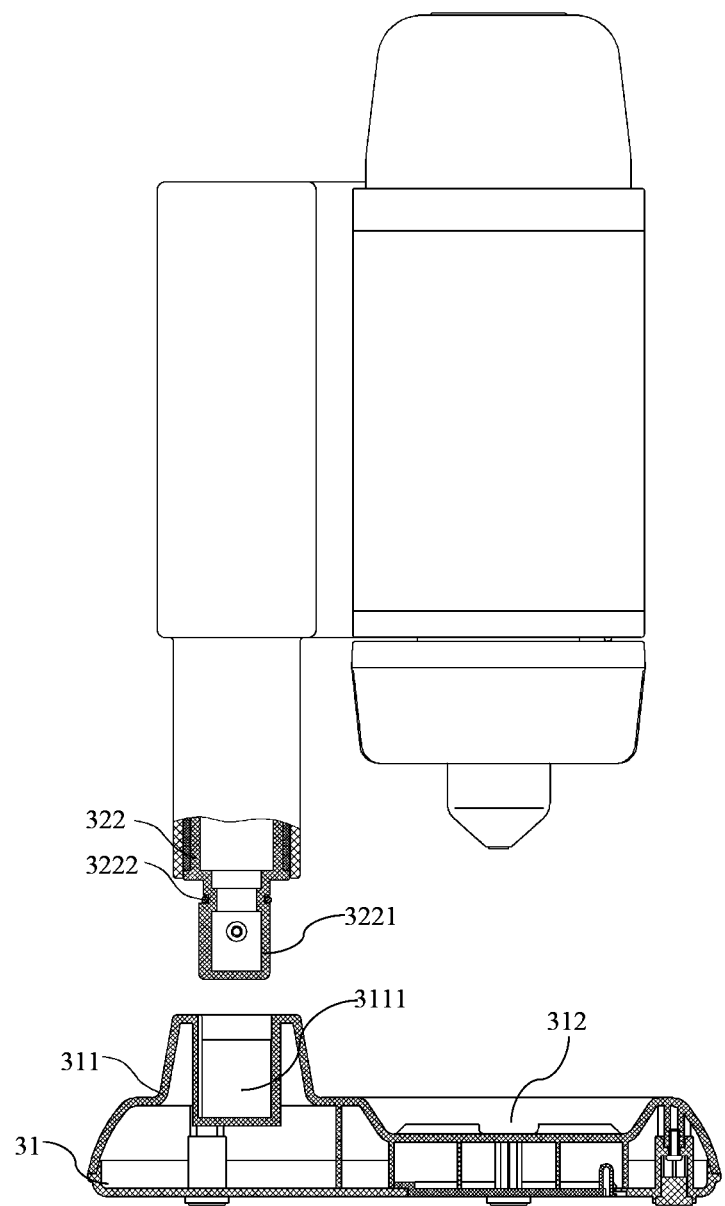
FIG. 8 illustrates that the substrate of the coffee machine is disconnected with the power-controller holder according to one embodiment as described herein.

FIGS. 7 and 8 respectively illustrate connection and disconnection of the substrate and the power-controller holder of the coffee machine according to one embodiment as described herein. As shown in FIG. 7, a protruded stage 3221 is disposed on the bottom of the main rod 322. An O-type rubber ring 3222 is sleeved on the protruded stage 3221 on the connection section of the protruded stage 3221 and the main rod 322. A mounting base 311 is disposed on the substrate 31, which has a snap hole 3111 disposed therein for snap-fitting with the protruded stage 3221. When mounting, the snap hole 3111 can be snap-fitted with the protruded stage 3221 and can hold the main rod 322, thereby fixedly supporting the power-controller holder 3 above the substrate 31. A cup holder 312 for receiving a coffee cup or a water cup or other containers is disposed on the upper side of the substrate which is the same side for the mounting base 312. The cup holder 312 is located below the capsule base 2 and corresponds to the capsule base 2, such that the beverage flowing out from the capsule base 2 can be received by the cup placed in the cup holder. The bottom of the substrate 31 is configured to be a flat structure for placing the coffee machine on a table, bar counter or other places with flat plane.

In an alternative embodiment of the present invention, the substrate 31 and the power-controller holder 3 can be configured to be detachable for ease of replacement with different substrates 31 to satisfy different settings. For example, when using the coffee machine in a car or other settings, the substrate 31 can be replace by a substrate suitable for cars or matching the using settings (which will be described in greater detail as below), which is easy to disassemble and use.

Figure 9:
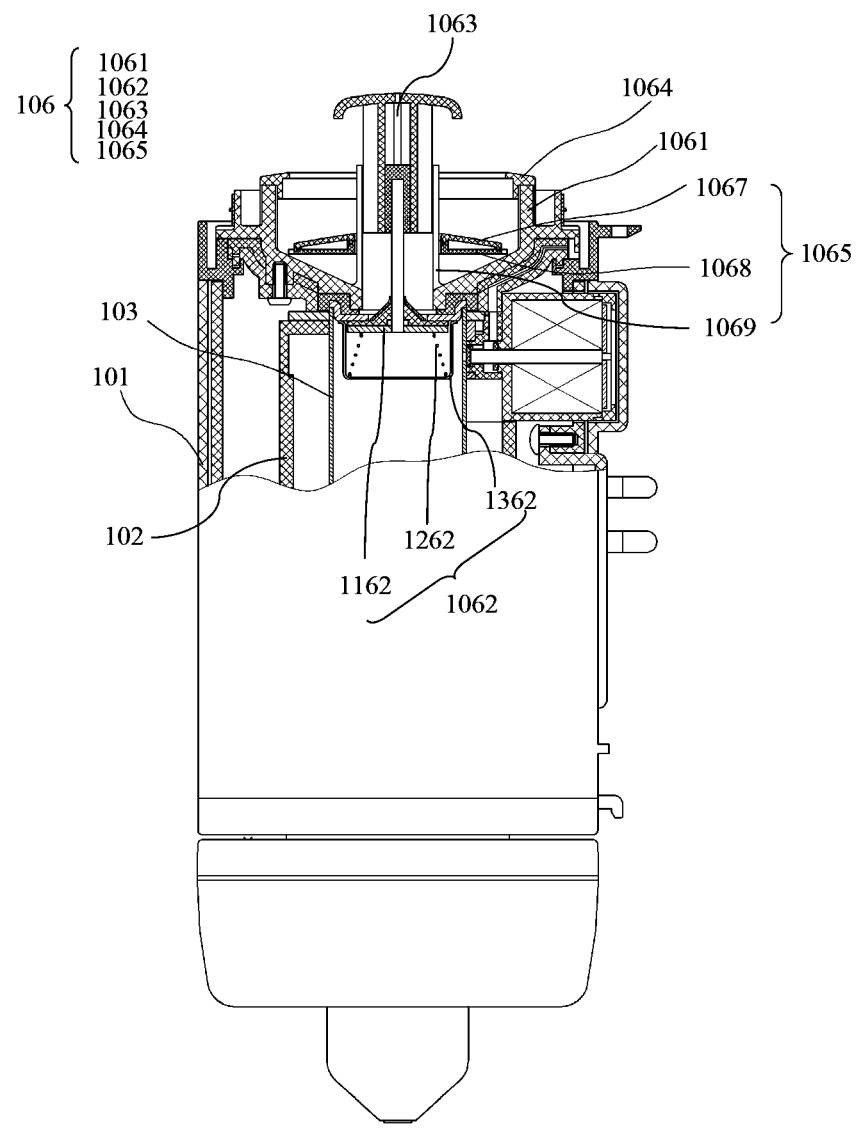
FIG. 9 shows the specific structure of the container in the main body of the coffee machine according to one embodiment as described herein.

FIG. 9 shows the specific structure of the container on the top of the coffee machine according to one embodiment as described herein. As shown in FIG. 9, the container 106 comprises a cup body 1061, a limiting valve 1062, a valve rod 1063, a cup ring 1064 and a floating lid 1065. The cup body 1061 is disposed on the top of the housing body 101 of the main body and a through hole is disposed on the bottom of the cup body 1061 for being in communication with the inner space of the pot liner 103. The limiting valve 1062 is disposed on the bottom of the cup body 1061 for opening or closing the through hole. The valve rod 1063 is located within the cup body 1061 and is connected to the limiting value 1062. The valve rod 1063 is configured to be operated to control the limiting valve 1062 to open or close. The cup ring 1064 covers the top of the cup body 1061 and the inner diameter of the cup ring 1064 is smaller than the inner diameter of the cup body 1061. The floating lid 1065 has a hole around the valve rod 1063 and is configured to move up and down in and along the cup body 1061. When the floating lid 1065 moves to the top of the cup body 1061, the floating lid 1065 is abutted against the cup ring 1064 to close the opening of the cup body 1061 together. In the embodiments of the present invention, the limiting valve 1062 is disposed on the upper position of the pot liner 103 and has a valve lid 1162 for blocking the through hole that keeps the pot liner 103 and the container 106 in communication with each other. The valve lid 1162 is directly connected to the valve rod 1063.

The valve lid 1162 is driven to open and close by movement of the valve rod 1063. A spring 1262 is disposed below the valve lid 1162, which elastically supports the valve lid 1162 to ensure that the valve lid 1162 is in closed state in the case that no external force is applied to the valve rod 1063. A valve base 1362 is disposed on the bottom of the spring 1262 and mounted on the top of the pot liner 103 for supporting the bottom of the spring 1262 and receiving the valve lid 1162 and spring 1262 therein.

The cup ring 1064 is sleeved on the top of the cup body 1061 and fixed relative to the cup body 1061. The floating lid 1065 is disposed within the cup body 1061 and limited by the cup ring 1064. The floating lid 1065 comprises an upper floating lid 1067, a lower floating lid 1068, a guide rail 1069 for limiting the movement rail of the floating lid 1065. The guide rail 1069 is disposed around the valve rod 1063. The floating lid 1065 moves up and down along the guide rail 1069. The outer diameter of the upper floating lid is smaller than the inner diameter of the cup ring 1064, such that the upper floating lid 1067 can go through the cup ring 1064. The outer diameter of the lower floating lid 1068 is larger than the inner diameter of the cup ring 1064, such that the lower floating lid 1068 is abutted against the cup ring 1064 when it moves up to the top of the cup body 1061. The upper floating lid 1067 and the lower floating lid 1068 are fixed together and the densities thereof are smaller than the density of water. Therefore, after the cup body 1061 is filled up with water, the floating lid 1065 and the cup ring 1064 together close the cup body 1061 so as to limit the volume of water filled in, thereby quantitively control the volume of the water filled in.

Figure 10:
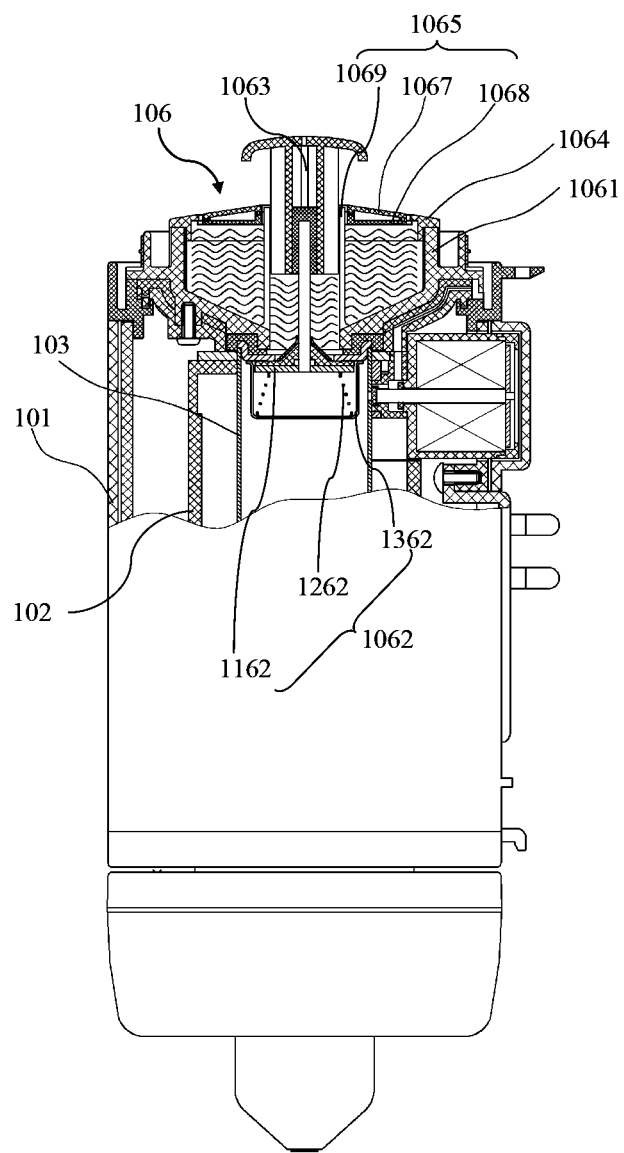
FIG. 10 shows that water is added into the container in the main body of the coffee machine according to one embodiment as described herein.

FIG. 10 is a schematic diagram of the container on the top of the coffee machine, which is filled up with water, according to one embodiment as described herein. As shown in FIG. 10, after filling the cup body 1061 with water, the floating lid 1065 will float on the water surface and go up with the water surface. Since the outer diameter of the upper floating lid 1067 is smaller than the inner diameter of the cup ring 1064 while the outer diameter of the lower floating lid 1068 is bigger than the inner diameter of the cup ring 1064, the floating lid will be limited when arriving at the top of the cup body 1061, such that the user cannot add water into the cup body 1061, thereby controlling the water level in the cup body 1061. If it needs to release water from the cup body 1061 into the pot liner 103, the upper part of the valve rod 1063 is pressed to allow the valve rod 1063 to push the limiting valve 1062 to open. At this time, the channel that keeps the cup body 1061 be in communication with the pot liner 103 is opened. The liquid flows from the channel to the pot liner 103. After withdrawing the external force, the limiting valve 1062 will be automatically closed.

In another alternative embodiment of the present invention, the upper floating lid 1067 and the lower floating lid 1068 are integrated as a whole. Otherwise, the upper floating lid 1067 is omitted and there is only lower floating lid 1068. Similarly, when the cup body 1061 is filled up with water, the floating lid 1065 is abutted against the cup ring 1064 to limit the volume of water filled in.

Figure 11:
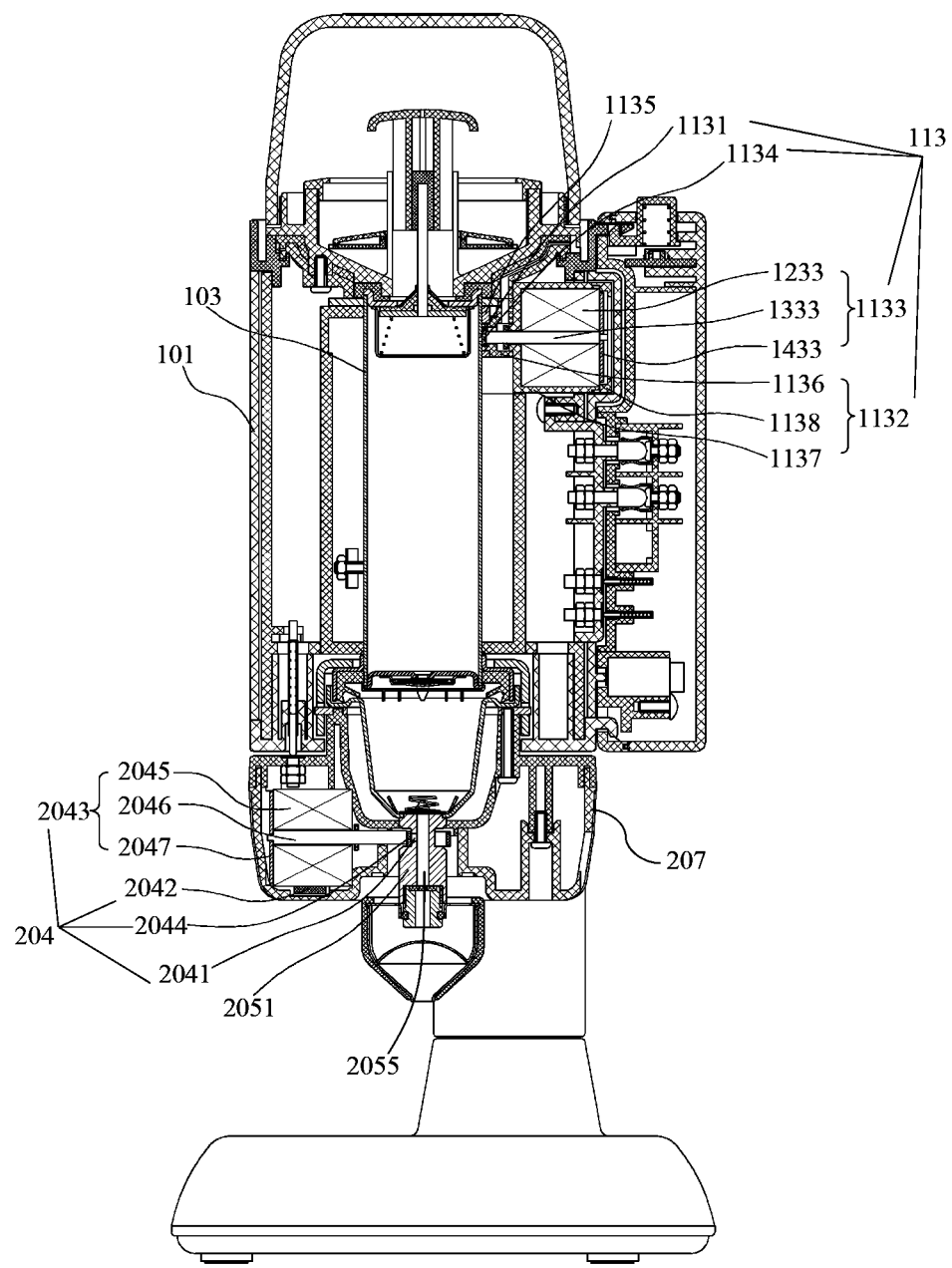
FIG. 11 shows the specific structure of the first and the second steam exhausting mechanisms of the coffee machine, which are in closed state, according to one embodiment as described herein.
Figure 12:
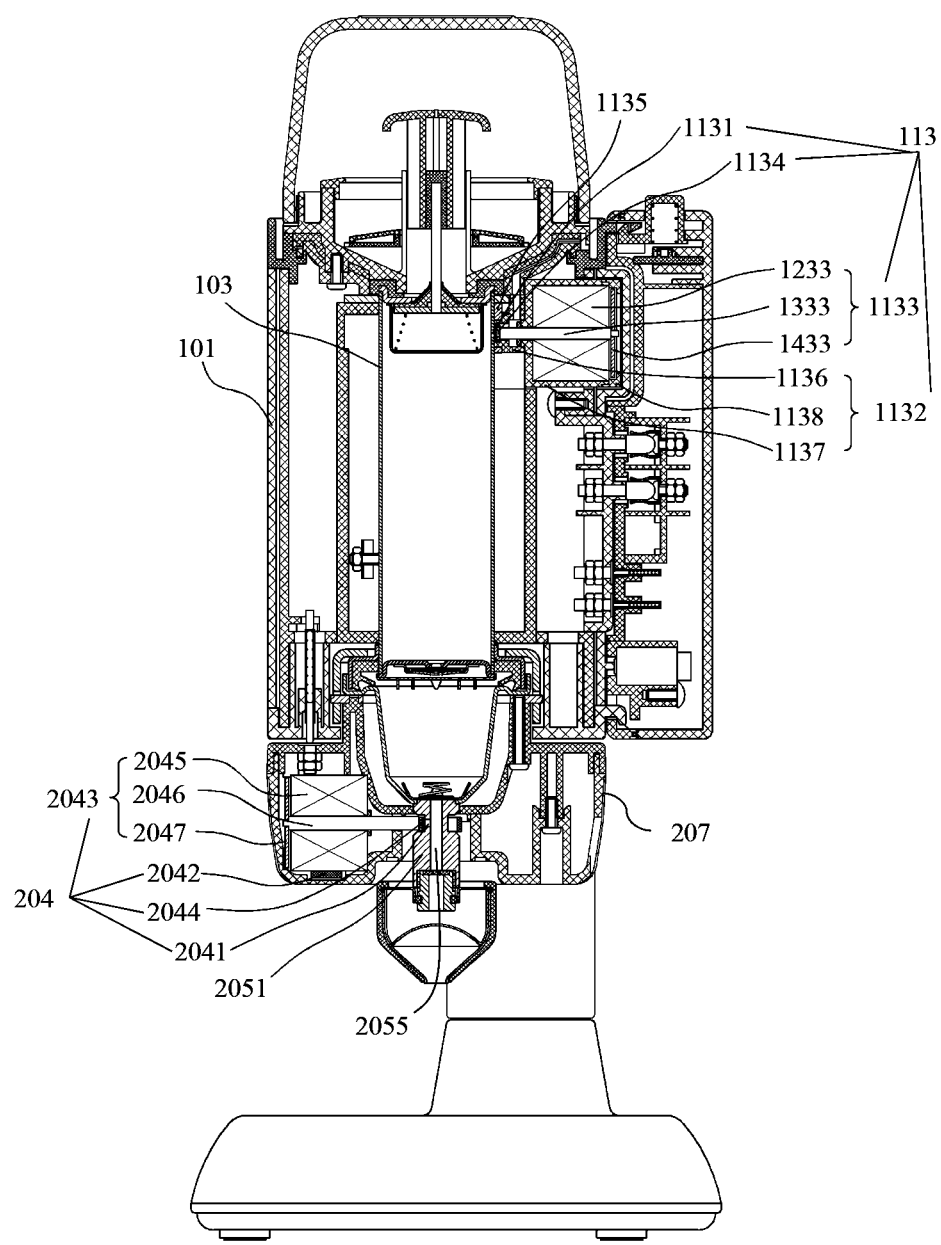
FIG. 12 shows the specific structure of the first and the second steam exhausting mechanisms of the coffee machine, which are in opened state, according to one embodiment as described herein.

FIGS. 11 and 12 respectively illustrate steam exhausting mechanisms 113 and 204 (the first and the second steam exhausting mechanisms) of the coffee machine in closed and opened state according to one embodiment as described herein. As shown in FIG. 11, the steam exhausting mechanism 113 (the first steam exhausting mechanism) on the side wall of the pot liner 103 comprises a steam outlet 1131, a supporting feature 1132, an electromagnetic mechanism 1133, a steam exhausting valve sheet 1134. The steam outlet 1131 is disposed on the side wall of the pot liner 103 and in communication with the inner space of the pot liner 103. The supporting feature 1132 is disposed within the housing of the main body 1 for supporting the electromagnetic mechanism 1133, which particularly comprises a steam exhausting valve base sheet 1135 disposed above the steam outlet 1131 and on the side wall of the pot liner, a steam exhausting valve holder 1136 fixedly connected to the steam exhausting valve base sheet 1135 for placing the steam exhausting valve socket 1137 of the electromagnetic mechanism 1133 and for fixing the steam exhausting valve lid 1138 of the electromagnetic mechanism 1133 together with the steam exhausting valve socket 1137. When supplying power to the electromagnetic mechanism 1133, it can produce magnetic force. The electromagnetic mechanism 1133 may comprise a chuck 1233, a chuck core 1333 and a chuck tab 1433. The chuck 1233 is mounted within the steam exhausting valve socket 1137, and has a chuck through hole at the center thereof which extends along the axis direction of the chuck. The chuck core 1333 is mounted within the chuck through hole and can move in the chuck through hole relative to the chuck 1233. One end of the chuck core 1333 corresponds to the steam outlet 1131 and a protruded stage is disposed on the other end. The chuck tab 1433 is disposed on one end of the chuck core 1333 far away from the steam outlet 1131. A center hole is disposed at the center of the chuck tab 1433, which can be snap-fitted with the protruded stage of the chuck core 1333. During supplying power, the chuck 1233 produces magnetic field to attract the chuck tab 1433 which presses the protruded stage of the chuck core 1333 to abut against the steam exhausting valve sheet 1134 disposed between the steam outlet 1131 and the chuck core 1333, thereby blocking the steam outlet 1131. In an alternative embodiment, the chuck tab 1433 is disposed on a side of the chuck 1233 facing the steam outlet 1131. The chuck core 1333 is located between the chuck tab 1433 and the steam outlet 1131. The chuck tab 1433 is made of magnetic materials. When supplying power to the chuck 1233, a repelling force is applied on the chuck tab 1433, such that the chuck tab 1433 presses the chuck core 1333 to abut against and block the steam outlet 1131.

As shown in FIG. 11, the steam exhausting mechanism 204 (a second steam exhausting mechanism) disposed within the capsule base 2 comprises a steam outlet 2041, a supporting feature 2042, an electromagnetic mechanism 2043 and a steam exhausting valve sheet 2044. The steam outlet 2041 is disposed on the side wall of the nozzle socket 2051 and in communication with the channel 2055 within the nozzle socket 2051. The supporting feature 2042 is fixedly disposed on the inner wall of the housing 207 of the capsule base. The electromagnetic mechanism 2043 is fixed by the supporting feature 2042 (for example, the supporting feature can be a chuck tape). The steam exhausting valve sheet 2044 opposites to the steam outlet 2041. In this embodiment, the electromagnetic mechanism 2043 comprises a chuck 2045, a chuck core 2046 and a chuck tab 2047. The chuck 2045 is fixed on the inner wall of the capsule base 2 by an arc-shaped chuck tape. A through hole is disposed at the center of the chuck 2045, which goes through the axis direction of the chuck 2045. The chuck core 2046 is mounted within the through hole and can be moved in the through hole relative to the chuck 2045. One end of the chuck core 2046 corresponds to the steam outlet 2041. A protruded stage is disposed on the other end of the chuck core far away from the steam outlet 2041. The chuck tab 2047 is disposed on one end of the chuck core 2046 far away from the steam outlet 2041, which has a center hole at the center thereof for snap-fitting with the protruded stage of the chuck core 2046. During supplying the power, the chuck 2045 produce magnetic field to attract the chuck tab 2047. The chuck tab 2047 presses the protruded stage of the chuck core 2046, such that the chuck core is abutted against the steam exhausting valve sheet 2044 disposed between the steam outlet 2041 and the chuck core 2046 to block the steam outlet 2041. In an alternative embodiment, the chuck tab 2047 is disposed on a side of the chuck 2045 facing the steam outlet 2041. The chuck core 2046 is located between the chuck tab 2047 and the steam outlet 2041. The chuck tab 2047 is made of magnetic materials. When supplying power to the chuck 2045, a repelling force is applied on the chuck tab 2047, such that the chuck tab 2047 presses the chuck core 2046 to abut against and block the steam outlet 2041.

FIG. 12 illustrates the first and the second steam exhausting mechanisms of the coffee machine in opened state according to one embodiment as described herein. As shown in FIG. 12, when the chuck 1233 of the steam exhausting mechanism (the first steam exhausting mechanism) 113 on the side wall of the pot liner 103 is powered off, the magnetic field of the chuck 1233 disappears. At this time, there is no attracting force between the chuck 1233 and the chuck tab 1433, such that the chuck tab 1433 will not abut against the chuck core 1333 that can move in the through hole at the center of the chuck 1233. Meanwhile, the steam outlet 1131 is not blocked by the steam exhausting valve sheet 1134, such that the steam outlet 1131 is in opened state and the gas in the pot liner 103 can be exhausted from the steam outlet 1131.

As shown in FIG. 12, the steam exhausting mechanism 204 (the second steam exhausting mechanism) is disposed on the side wall of the nozzle socket 2051 in the capsule base 2. When no electric power is supplied to the chuck 2045 of the steam exhausting mechanism 204 (the second steam exhausting mechanism), the magnetic field of the chuck 2045 disappears. At this time, there is no attracting force between the chuck 2045 and the chuck tab 2047, such that the chuck tab 2047 will not abut against the chuck core 2046 which can move in the through hole at the center of the chuck. Meanwhile, the steam outlet 2041 is not blocked by the steam exhausting valve sheet 2044, such that the steam outlet 2041 is in opened state and the gas in the nozzle socket 2051 can be exhausted from the steam outlet 2041 to adjust the pressure in the nozzle socket 2051.

In the embodiment of the present invention, a third connection feature and a fourth connection feature are used to detachably connect the main body 1 and the capsule base 2. And a third electric connection feature and a fourth electric connection feature are used to electrically connect the main body 1 and the capsule base 2. The third connection feature comprises a snap ring 114 disposed below the main body 1. The fourth connection feature comprises a snap sheet 202 disposed on the side of the capsule holder 201 in the capsule base 2. The third electric connection feature comprises a power-supplying needle 110 disposed on the bottom of the main body 1. The fourth electric connection feature comprises a power-taking nail 203 disposed on the upper side of the capsule base 2 and being close to the side edge.

Figure 13:
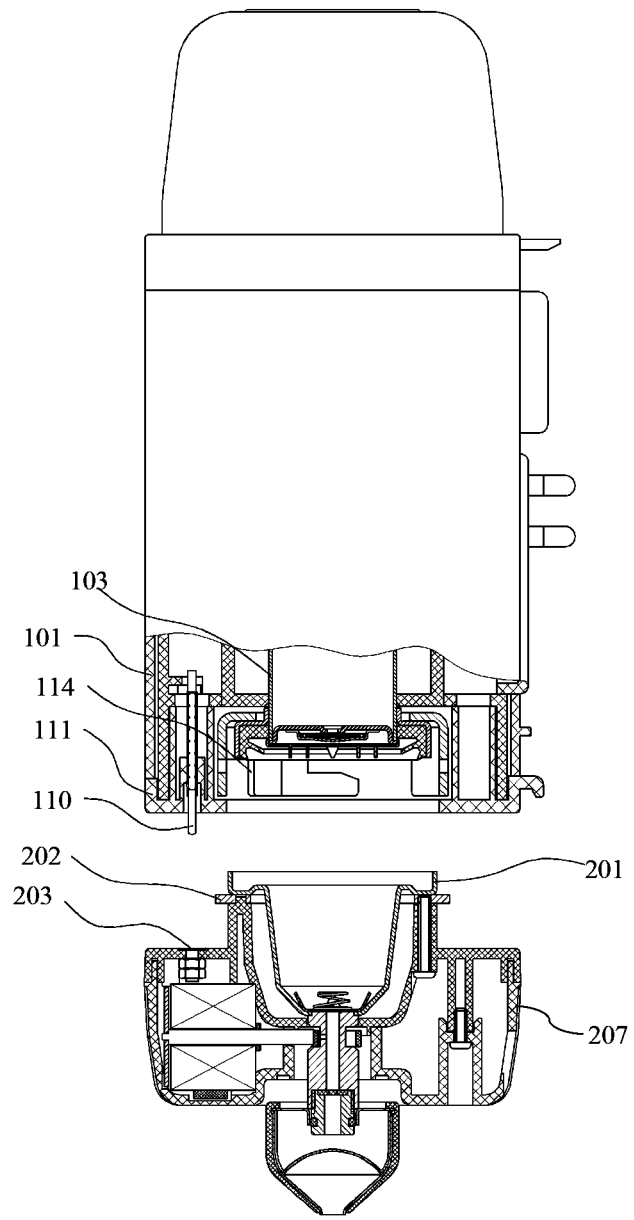
FIG. 13 illustrates that the main body is disconnected with the capsule base according to one embodiment as described herein.
Figure 14:
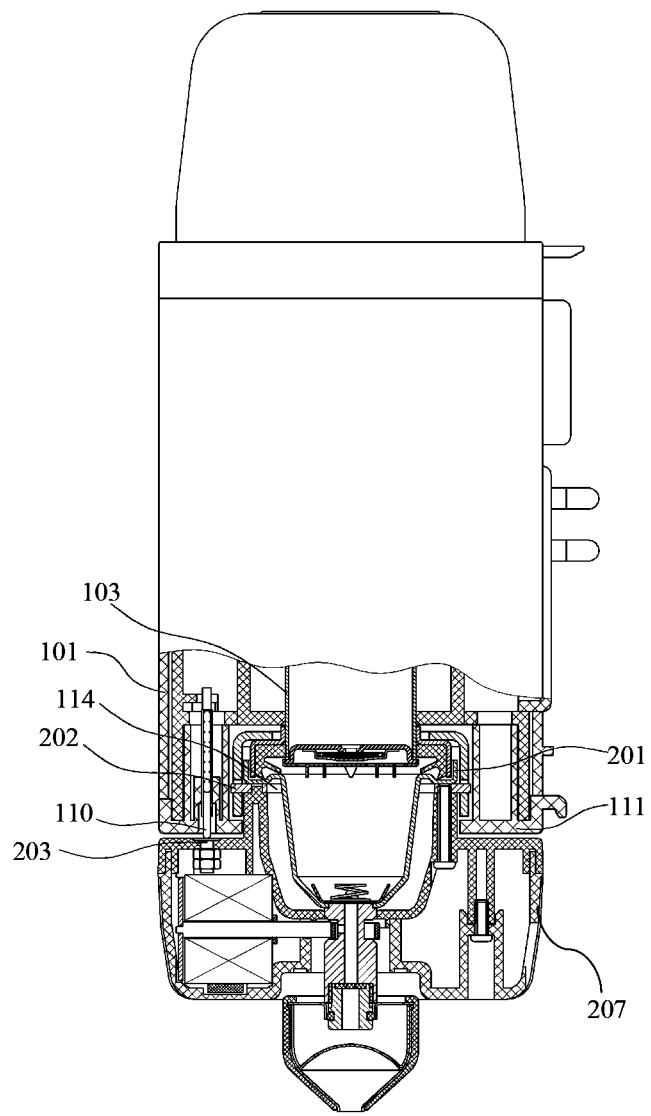
FIG. 14 illustrates that the main body is snap-fitted with the capsule base according to one embodiment as described herein.

FIGS. 13 and 14 illustrate that the main body is disconnected with and snap-fitted with the capsule base according to one embodiment as described herein. As shown in FIG. 13, when the main body 1 is disconnected with the capsule base 2, the large power-supplying needle 110 disposed on the bottom of the base lid 111 of the main body and being close to the side edge is in extended state, with its one end protruded from the base lid. As shown in FIG. 14, when the main body 1 is snap-fitted with the capsule base 2, the snap tab 202 disposed on the side edge of the capsule holder 201 is snap-fitted with the snap ring 114 and meanwhile, the large power-supplying needle 110 is abutted against the power-taking nail 203 and in the pressed state, such that both of them keep in good contact to ensure that the electric power will not be cut off.

Figure 15:
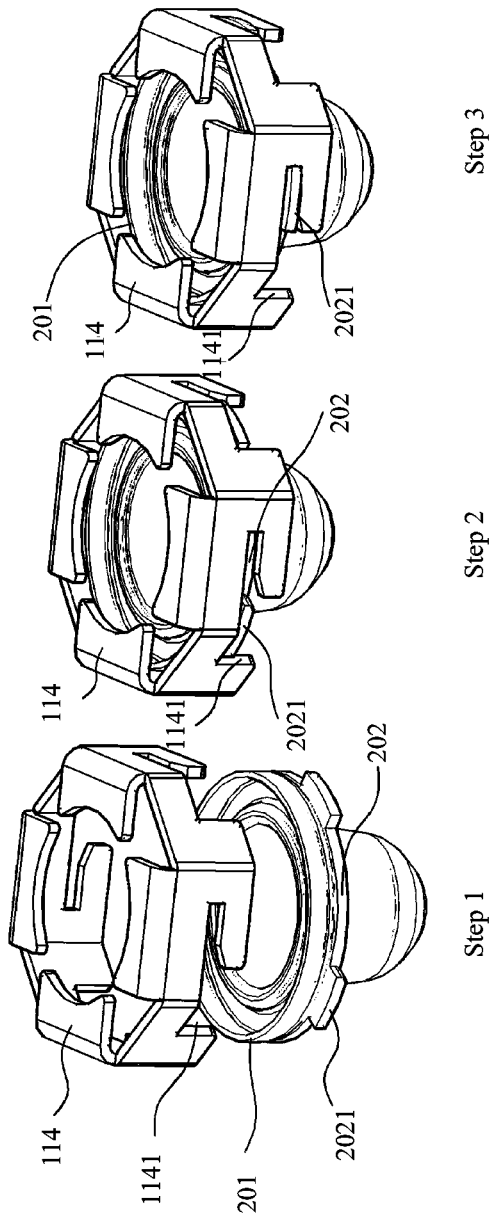
FIG. 15 illustrates the snap-fitting steps for snap-fitting the main body with the capsule base according to one embodiment as described herein.

FIG. 15 illustrates snap-fitting action of the main body and the capsule base according to one embodiment as described herein. As shown in FIG. 15, the snap ring 114 is mounted on the bottom of the main body 1 and L-type nicks 1141 are symmetrically disposed on the side wall of the snap ring 114. The snap tab 202 is mounted on the side edge of the capsule holder 201 of the capsule base 2. Protrusions 2021 are symmetrically disposed on the side wall of the snap tab 202 toward the outside. The snap-fitting action is completed by following steps: (1) aligning the protrusions 2021 with the nicks 1141; (2) allowing the protrusions 2021 of the snap tab 202 to go into the nicks 1141 along the axis of the capsule holder 201, (3) allowing the protrusions 2021 of the snap tab 202 to rotate around the axis of the capsule holder 201 so as to snap-fit the protrusions 2021 with the nicks 1141, thereby achieving the snap-fitting action of the main body 1 and the capsule base 2.

In an alternative embodiment of the present invention, the position of the snap tab 202 can be exchanged with the position of the snap ring 114. For example, a snap tab 202 protruded inward can be disposed on the bottom of the main body 1. The snap ring 114 corresponding to the snap tab 202 can be disposed on the side wall of the capsule holder 201, thereby achieving the snap-fitting action of the main body 1 and the capsule base 2.

In another alternative embodiment of the present invention, the main body 1 is connected to the capsule base 2 by threaded connection. Outer threads are disposed on the side wall of the capsule holder 201, and inner threads matching the outer threads are disposed on the bottom of the main body 1, so as to achieve detachable connection.

In the embodiment of the present invention, referring to FIGS. 16(*a*) and 16(*b*), the liquid outlet 205 can comprise a nozzle socket 2051, a nozzle 2052 mounted below the nozzle socket 2051, a steam-liquid separator 2053 detachably connected to the nozzle 2052 and a constant pressure rubber sheet 2054 disposed at the connection section of the nozzle socket 2051 and the nozzle 2052. The nozzle socket 2051 is directly connected to the bottom of the capsule holder 201 and has a channel 2055 in communication with the capsule holder 201. The nozzle socket 2051 is in threaded connection with the nozzle 2052 for ease of disassembly and cleaning. The constant pressure rubber sheet 2054 disposed at the connection section of the nozzle socket 2051 and the nozzle 2052 has a hole on its top. The liquid in the capsule holder 201 cannot flow out from the nozzle immediately due to the said hole, so as to provide pressure that facilitates to extract coffee.

When the pressure in the channel 2055 of the nozzle socket 2051 arrives at the preset value, the constant pressure rubber sheet 2054 will not block the channel 2055, such that liquid flows out from the nozzle socket 2051. The nozzle 2052 is peripherally provided with a slot, in which a O-type rubber ring 2152 is disposed. The O-type rubber ring 2152 can be stuck in the mounting hole 2253 in the middle of the steam exhausting fin 2153, such that the steam-liquid separator 2053 is fixed on the bottom of the capsule base 2 for ease of disassembly, cleaning and maintenance of the steam-liquid separator 2053.

Referring to FIGS. 16(*a*) and 16(*b*), the steam-liquid separator 2053 can comprise a steam exhausting fin 2153 disposed on the top thereof, a mounting hole 2253 disposed at the center of the steam exhausting fin 2153, an arc-shaped filter mesh 2353 disposed on the inner wall of the steam-liquid separator 2053 and below the mounting hole 2253, and a liquid outlet 2453 disposed on the bottom of the steam-liquid separator 2053, through which the liquid flows out. The steam exhausting fin 2153 is used to exhaust the steam from the top of the steam-liquid separator 2053. The filter mesh 2353 is used to filter the impurities from the liquid and separate the liquid from the steam. The liquid outlet 2453 is used to drain the liquid.

As shown in FIG. 16(*a*), the steam-liquid separator 2053 is mounted on the nozzle 2052. The O-type rubber ring 2152 on the nozzle 2052 matches the mounting hole 2253 in the middle of the steam exhausting fin 2153 of the steam-liquid separator 2053, such that the steam-liquid separator 2053 is engaged with the capsule base 2. During brewing coffee, the brewed liquid coffee flows into the nozzle 2052 from the capsule holder 201 through the channel 2055 of the nozzle socket 2051, and finally flows into the steam-liquid separator 2053. The steam is separated from the liquid by the filter mesh 2353 on the top of the steam-liquid separator 2053, such that the steam is exhausted out from the steam exhausting fin 2153 and the liquid flows out from the liquid outlet 2453. As such, separation of steam from the liquid is achieved. As shown in FIG. 16(*b*), the steam-liquid separator 1053 can be detached from the nozzle 2052 for the purpose of maintenance and cleaning of the steam-liquid separator 2053.

In another embodiment of the present invention, the coffee machine has a vehicle-mounted base 31' for using in vehicles such as cars. The vehicle-mounted base has an engaging part 313 whose diameter can be adjusted and can be placed in the cup hole in a car. The dimension of the engaging part 313 can be adjusted according to the size of the cup hole in various cars for ease of mounting and using.

Figure 17A:
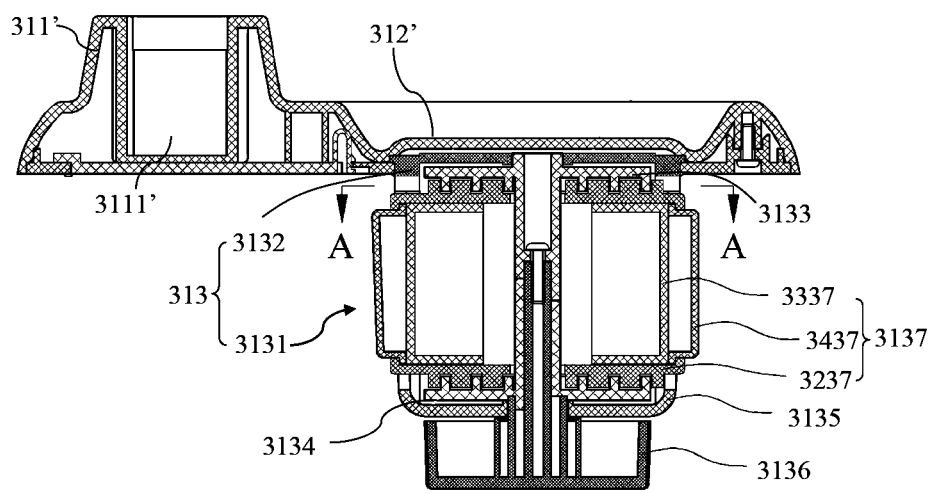
FIG. 17(a) is a schematic diagram of the substrate of the coffee machine according to another embodiment as described herein.
Figure 17B:
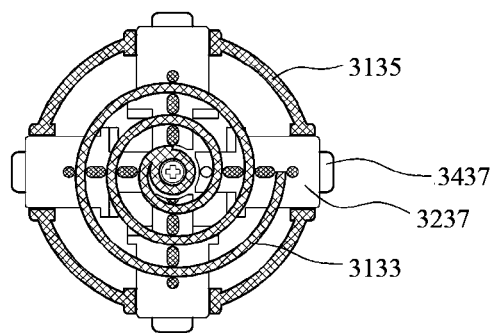
FIG. 17(b) shows a cross-section diagram of the substrate of the coffee machine along line A-A according to another embodiment as described herein.
Figure 18A:
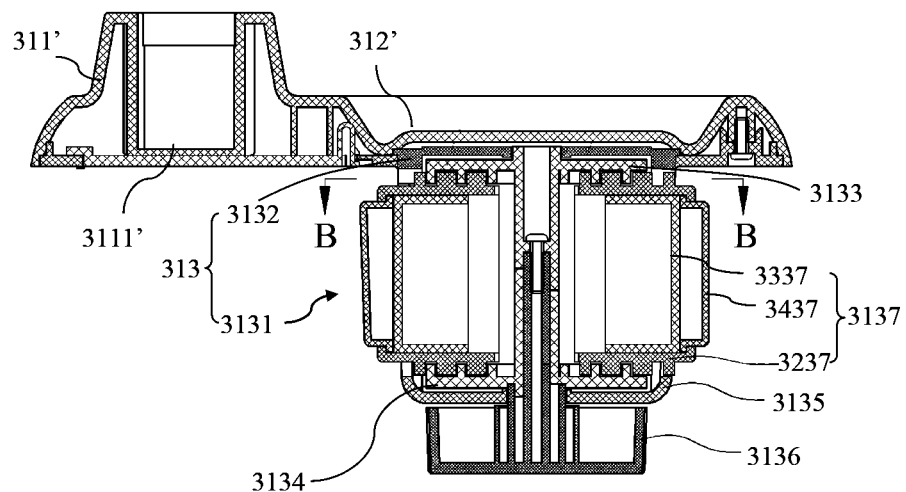
FIG. 18(a) illustrates that the dimension of the substrate of the coffee machine is adjusted according to another embodiment as described herein.

FIGS. 17 and 18 illustrate schematic diagram of the base with engaging part according to another embodiment as described herein. This embodiment is different from the embodiments as mentioned above in that substrate 31 in the above-mentioned embodiments is replaced by the base 31' for mounting the coffee machine in vehicles such as cars, especially mounting on the stage with a cup hole. As shown in FIG. 17(*a*), the base 31' comprises a mounting base 311' disposed above the base 31', a mounting hole 3111' disposed within the mounting base 311' and a cup holder 312' disposed on the same side as the mounting base 311'. An engaging part 313 is disposed below the cup holder 312' of the base 31' for engaging with the stage with hole therein. The engaging part 313 comprises a snap-fitting disk 3131 disposed on the lower surface of the base 31' for adjusting the size of the engaging part 313' and a fixing disk 3132 for connecting the snap-fitting disk 3131 and the base 31'.

As shown in FIGS. 17(*a*) and 18(*a*), the snap-fitting disk 3131 comprises an upper spiral disk 3133, a lower spiral disk 3134, a disk lid 3135, a knob 3136 and a movement block 3137. The fixing disk 3132 is mounted below the cup holder 312' and provided with a fixing hole at the center thereof. The upper spiral disk 3133 has a center shaft at the center thereof, which matches the fixing hole of the fixing disk 3132. One end of the center shaft is snap-fitted in the fixing hole, such that the upper spiral disk 3133 can rotate around the fixing hole. The upper spiral disk 3133 is provided with a spiral slot on the lower side surface thereof. The lower spiral disk 3134 is fixedly connected to the center shaft of the upper spiral disk 3133, such that the upper and the lower spiral disks 3133 and 3134 can rotate synchronously. The lower spiral disk 3134 is provided with a spiral slot on the upper side surface thereof, which is the same as that of the upper spiral disk 3133. The movement block 3137 is fixed by the upper and the lower spiral disks 3133 and 3134 together. The housing 3237 of the movement block 3137 is provided with protrusions on its top and bottom, which match the spiral slots of the upper and lower spiral disks 3133 and 3134. When the upper and the lower spiral disks 3133 and 3134 rotate, the movement block 3137 will laterally moves relative to the rotation axis of the upper and the lower spiral disks 3133 and 3134, so as to adjust the size of the engaging disk 3131 to snap-fit with various cup holes.

The housing 3237 of the movement block 3137 has a square hole on one side far away from the center axis of the upper spiral disk 3133. The movement block 3137 further comprises a gum sleeve 3437 extending from the square hole of the housing 3237 of the movement block for directly contacting the inner wall of the cup hole in cars, and a pressing block 3337 located behind the gum sleeve for fixing the position of the gum sleeve 3437.

The knob 3136 is disposed below the disk lid 3135, which goes through the bottom surface of the disk lid 3135 to directly connect to the center shaft of the upper spiral disk 3133. The upper and the lower spiral disks 3133 and 3134 are driven to rotate together by rotation of the knob 3136, so as to drive the movement block 3137 to move.

FIG. 17(b) is a cross-section diagram of the engaging part along line A-A. As shown in FIG. 17(b), the protrusions disposed on the top and the bottom of the housing 3237 of the movement block are snap-fitted within the spiral slot of the upper spiral disk 3133 to secure the movement block 3137.

Figure 18B:
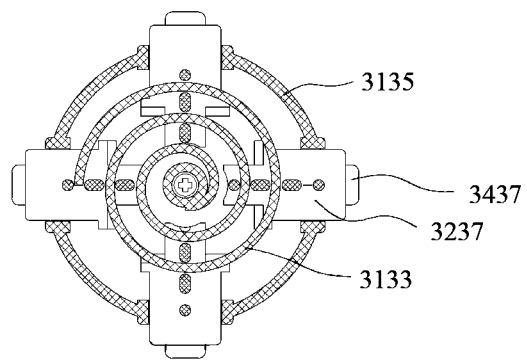
FIG. 18(b) shows a cross-section diagram of the substrate of the coffee machine along line B-B according to another embodiment as described herein.

FIG. 18(b) is a cross-section diagram of the engaging part along line B-B. As shown in FIG. 18(b), when rotating knob 3136 clockwise, the upper and the lower spiral disks 3133 and 3134 are driven to rotate together so as to allow the protrusions disposed on the top and the bottom of the housing 3237 of the movement block to move far away from the rotation axis of the knob 3136, thereby allowing the movement block 3137 to extend outward.

Although the preferred embodiments of the present invention have been described and illustrated herein, it is obvious to those skilled in the art that these embodiments are only for the purpose of illustration. It will be apparent to those skilled in the art that numerous variations, modifications and substitutions can be made to these embodiments without departing from the scope and spirit of the present invention. The scope of the present invention is defined by the appended claims and the methods and structures as fall within the claims together with the equivalents thereof are intended to be embraced by the appended claims.

The invention claimed is:

1. A coffee machine, comprising:
   a main body (1) that comprises a housing (101), a pot liner (103) disposed within the housing (101), a heater in the pot liner (103), and a container (106) disposed above the pot liner (103) and being in communication with the inner space of the pot liner (103);
   a capsule base (2) detachably connected on the bottom of the main body (1), which comprises a capsule holder (201) for receiving a coffee capsule, a liquid outlet (205) disposed below the capsule holder (201) and being in communication with the capsule holder (201), wherein the capsule holder (201) is suitable for being in communication with the inner space of the pot liner (103) when the capsule base (2) is connected to the main body (1); and
   a power-controller holder (3) detachably connected to the outside of the housing (101), for supporting, powering and controlling the main body (1), wherein:
      the power-controller holder (3) comprises:
         a substrate (31) with a mounting socket (311) disposed on the top surface thereof, and
         a supporting part (32) detachably connected to the mounting socket (311) on the substrate (31), and detachably connected to the housing (101) of the main body;
         wherein the supporting part (32) comprises:
            a casing (321) and a main rod (322) disposed within the casing (321), for supporting the casing (321), wherein, the main rod (322) has one end extending out from the casing (321), which is detachably mounted in the mounting socket (311) of the substrate (31), and wherein the casing (321) is detachably connected to the housing (101) of the main body on one side thereof.

2. The coffee machine of claim 1, wherein the inner wall of the casing (321) is supported on the main rod (322) by an elevator (323) that is configured to allow the casing (321) to move up and down along the main rod (322).

3. The coffee machine of claim 1, wherein a cup holder (312) is disposed on the top surface of the substrate (31) of the power-controller holder (3), which is adjacent to the mounting socket (311) and aligns with the bottom of the capsule base (312);
   wherein the lower surface of the substrate (31) of the power-controller holder (3) is a flat surface for placing on a flat stage; or
   wherein the power-controller holder (3) has an engaging part (313) on the lower surface of the substrate (31), for engaging with the hole on a stage, which is opposite to the cup holder (312) and protrudes downward from the lower surface of the substrate (31).

4. The coffee machine of claim 3, wherein the engaging part (313) comprises a snap-fitting disk (3131) disposed on the lower surface of the substrate (31), for adjusting the engaging dimension of the engaging part (313), and a fixing disk (3132) for connecting the snap-fitting disk (3131) and the substrate (31).

5. The coffee machine of claim 1, wherein the housing (101) of the main body has a first connection feature (107) disposed thereon, and the power-controller holder (3) has a second connection feature (301) disposed thereon, and wherein the first connection feature (107) is detachably connected to the second connection feature (301).

6. The coffee machine of claim 5, wherein the first connection feature (107) comprises:
   a male tab (1071) disposed on a side surface of the housing (101) facing the casing (321) of the power-controller holder (3) and having an extending part protruded from the side surface;
   a buckle (1072) disposed on a side surface of the housing (101) facing the casing (321) of the power-controller holder (3) and spaced from the male tab (1071), which has a bending part protruded from the side surface.

7. The coffee machine of claim 6, wherein the second connection feature (301) comprises:
   an upper jack (3011) disposed on a side surface of the casing (321) of the power-controller holder (3) facing the main body (1) and having an opening on the side surface of the casing to receive the male tab (1071);
   a lower jack (3012) disposed on a side surface of the casing (321) of the power-controller holder (3) facing the main body (1), which is spaced from the upper jack (3011) and has an opening on the surface to receive the buckle (1072).

8. The coffee machine of claim 7, wherein the extending part of the male tab (1071) has a through hole (1073) disposed thereon;
   wherein the upper jack (3011) has a snap-fitting mechanism (3013) disposed therein, which is engaged with the through hole (1073) to prevent the male tab (1071) from detaching from the upper jack (3011), and the snap-fitting mechanism (3013) comprises a snap button (3014), a snap button spring (3015) and a baseboard (3016).

9. The coffee machine of claim 8, wherein:
   the snap button (3014) comprising a pressing part (3017) passing through the inside of the casing (321) and extending from the inside to the outside and a hook part (3018) extending from a side surface of the pressing part toward the opening of the upper jack (3011), wherein the hook part (3018) is suitable for snap-fitting within the through hole (1073);

the baseboard (3016) located below the snap button (3014) and fixed on the casing (321), which elastically supports the button (3014) via the snap button spring (3015).

10. The coffee machine of claim 1, wherein:
a first electrical connection feature (108) is disposed on a side surface of the housing (101) of the main body facing the casing (321) of the power-controller holder (3),
a second electrical connection feature (302) is disposed on a side surface of the casing (321) of the power-controller holder (3) facing the main body (1), and
the first electrical connection feature (108) is engaged with and electrically connected with the second electrical connection feature (302) to supply power to and be in communication with the main body (1).

11. The coffee machine of claim 10, wherein:
the first electrical connection feature (108) comprises a plug (1081) and a power-taking nail (1082) disposed on a side surface of the housing (101) of the main body facing the casing (321) of the power-controller holder (3); and
the second electrical connection feature (302) comprises a socket (3021) matching the plug (1081) and a power-supplying needle (3022) matching the power-taking nail (1082) disposed on a side surface of the casing (321) of the power-controller holder (3) facing the main body (1).

12. The coffee machine of claim 1, wherein the main body (1) comprises a first steam exhausting mechanism (113) disposed within the housing (101) of the main body and located on the side wall of the pot liner (103), for adjusting the pressure in the pot liner (103);
wherein the first steam exhausting mechanism (113) comprises:
a steam outlet (1131) disposed on the side wall of the pot liner (103) and in communication with the inner space of the pot liner (103),
a supporting feature (1132) fixed within the housing (101) of the main body;
an electromagnetic mechanism (1133) supported by the supporting feature (1132), for producing magnetic force, the electromagnetic mechanism (1133) comprising a chuck (1233), a chuck core (1333) and a chuck tab (1433); and
a steam exhausting valve sheet (1134), disposed opposite to the steam outlet (1131) and supported on the supporting feature (1132) by a connector;
wherein the connector is suitable for interacting with the magnetic force produced by the electromagnetic mechanism (1133) to move the steam exhausting valve sheet (1134), so as to allow the steam exhausting valve sheet (1134) to open or close the steam outlet (1131).

13. The coffee machine of claim 1, wherein the capsule base (2) further comprises a capsule base casing (207) for receiving and supporting the capsule holder (201) and the liquid outlet (205);
wherein a third connection feature is disposed on the bottom of the housing (101) of the main body, and a fourth connection feature is disposed on the top of the capsule base casing (207) and wherein the third connection feature is detachably connected to the fourth connection feature.

14. The coffee machine of claim 13, wherein:
a third electrical connection feature (110) is disposed on the bottom of the housing (101) of the main body, and a fourth electrical connection feature (203) is disposed on a position on the top of the capsule base casing (207), corresponding to the third electrical connection feature (110), and
the third electrical connection feature (110) is detachably connected to the fourth electrical connection feature (203).

15. The coffee machine of claim 13, wherein the liquid outlet comprises:
a nozzle socket (2051) connected to the bottom of the capsule holder (201) and having a channel (2055) in communication with the capsule holder (201),
a nozzle (2052) removably mounted in the nozzle socket (2051) and in communication with the channel (2055), and
a steam-liquid separator (2053) detachably connected to the nozzle (2052), for separating the water vapor from the liquid and discharging the liquid.

16. The coffee machine of claim 15, wherein a channel valve (2054) for opening or closing the channel (2055) is disposed at the connection section of the nozzle socket (2051) and the nozzle (2052).

17. The coffee machine of claim 16, wherein the capsule base (2) further comprises a second steam exhausting mechanism (204) disposed on the side wall of the nozzle socket (2051), for adjusting the pressure in the nozzle socket (2051);
wherein the second steam exhausting mechanism (204) comprises:
a steam outlet (2041) disposed on the side wall of the nozzle socket (2051) and in communication with the channel (2055) within the nozzle socket (2051),
a supporting feature (2042) fixed in the capsule base casing (207),
an electromagnetic mechanism (2043) supported by the supporting feature (2042), for producing magnetic force, the electromagnetic mechanism (2043) comprising a chuck (2045), a chuck core (2046) and a chuck tab (2047) and
a steam exhausting valve sheet (2044) opposite to the steam outlet (2041) and supported on the supporting feature (2042) by a connector,
wherein the connector is suitable for interacting with the magnetic force produced by the electromagnetic mechanism (2043) to move the steam exhausting valve sheet (2044) to open or close the steam outlet (2041).

18. The coffee machine of claim 1, wherein the container (106) comprises:
a cup (1061) disposed on the top of the housing (101) of the main body and having a through hole on the bottom thereof for being in communication with the inner space of the pot liner (103),
a flow-limiting valve (1062) disposed on the bottom of the cup (1061), for opening or closing the through hole, and
a valve rod (1063) disposed in the cup (1061) and connected to the flow-limiting valve (1062), which is configured to be manipulated to control the flow-limiting valve (1062) to open and close.

19. The coffee machine of claim 18, wherein the container further comprises:
a cup ring (1064) disposed on the top of the cup (1061), with an inner diameter smaller than that of the cup,
a floating lid (1065) with a hole around the valve rod (1063) and configured to be disposed within the cup (1061) and move up and down along the cup (1061), which is abutted against the cup ring (1064) to close the opening of the cup (1061) when moving to the top of the cup (1061).

\* \* \* \* \*

UNITED STATES PATENT AND TRADEMARK OFFICE
CERTIFICATE OF CORRECTION

| | | |
|---|---|---|
| PATENT NO. | : 12,089,772 B2 | |
| APPLICATION NO. | : 17/250129 | |
| DATED | : September 17, 2024 | |
| INVENTOR(S) | : Jianming Cai | |

It is certified that error appears in the above-identified patent and that said Letters Patent is hereby corrected as shown below:

In the Specification

In Column 16, Line 6, delete "quantitively" and insert -- quantitatively --.

Signed and Sealed this
Tenth Day of December, 2024

Katherine Kelly Vidal
*Director of the United States Patent and Trademark Office*